United States Patent
Fakhari

(10) Patent No.: US 7,810,277 B2
(45) Date of Patent: Oct. 12, 2010

(54) LAWN EDGING WITH INTEGRAL ELECTRICAL CONDUCTOR AND CLIP CONNECTORS

(75) Inventor: John Fakhari, Fort Worth, TX (US)

(73) Assignee: Alf Operating Partners, Ltd., Fort Worth, TX (US)

( * ) Notice: Subject to any disclaimer, the term of this patent is extended or adjusted under 35 U.S.C. 154(b) by 117 days.

(21) Appl. No.: 12/212,198

(22) Filed: Sep. 17, 2008

(65) Prior Publication Data

US 2009/0064571 A1  Mar. 12, 2009

Related U.S. Application Data

(63) Continuation-in-part of application No. 11/924,604, filed on Oct. 25, 2007, which is a continuation-in-part of application No. 11/076,372, filed on Mar. 9, 2005, now abandoned, which is a continuation-in-part of application No. 10/234,991, filed on Sep. 4, 2002, now abandoned.

(51) Int. Cl.
| | |
|---|---|
| *A01G 1/00* | (2006.01) |
| *E02D 27/00* | (2006.01) |
| *E01F 13/00* | (2006.01) |
| *E01F 9/00* | (2006.01) |
| *H01R 13/60* | (2006.01) |
| *F21S 8/00* | (2006.01) |

(52) U.S. Cl. ............... 47/33; 52/102; 404/6; 404/7; 439/535; 439/111; 362/152; 362/153.1

(58) Field of Classification Search ............ 47/33; 52/102; 404/6, 7; 362/152, 183, 576, 153, 362/153.1, 652, 655, 657, 640, 653, 658; 439/111, 115, 116, 533, 110, 114, 120, 121, 439/122, 214, 215, 527, 532, 535, 650; D11/118; D26/25; 315/185; 40/550

See application file for complete search history.

(56) References Cited

U.S. PATENT DOCUMENTS

| 1,977,021 A | | 10/1934 | Spencer |
| 2,727,086 A | * | 12/1955 | Madaras .................. 174/51 |
| 3,041,781 A | * | 7/1962 | Richter ..................... 47/33 |
| 3,495,352 A | | 2/1970 | Sbare |

(Continued)

FOREIGN PATENT DOCUMENTS

EP  1586233 A1  10/2005

OTHER PUBLICATIONS http://www.sasklifestyles.com/archive/Aug21-01.htm, pp. 1-11.

*Primary Examiner*—Andrea M Valenti
(74) *Attorney, Agent, or Firm*—Erickson, Kernell, Derusseau & Kleypass, LLC

(57) ABSTRACT

A lawn edging strip includes imbedded conductors which can be used to conduct low voltage electricity to allow the lawn edging to double as a lighting strip. The lawn edging product enables solderless connection of one or more low voltage lights at points along the length of the edging using a light socket body with a plug adapted for insertion into holes formed in the strip to expose embedded conductors. Adjacent sections of lawn edging may be connected together physically and electrically.

13 Claims, 21 Drawing Sheets

U.S. PATENT DOCUMENTS

| | | | |
|---|---|---|---|
| 3,500,036 A | 3/1970 | Szentveri | |
| 3,609,643 A * | 9/1971 | Connan | 439/419 |
| 4,514,790 A | 4/1985 | Will | |
| 4,514,791 A * | 4/1985 | Tokieda | 362/249.01 |
| 4,667,276 A * | 5/1987 | Cheng | 362/249.01 |
| 4,945,675 A | 8/1990 | Kendrick | |
| 4,999,755 A * | 3/1991 | Lin | 362/217.02 |
| 5,259,154 A * | 11/1993 | Lilley | 47/33 |
| 5,310,355 A | 5/1994 | Dannatt | |
| 5,317,833 A | 6/1994 | Goldman | |
| 5,321,593 A * | 6/1994 | Moates | 362/249.05 |
| 5,410,458 A | 4/1995 | Bell | |
| 5,562,341 A * | 10/1996 | Strauss | 362/659 |
| 5,603,621 A * | 2/1997 | Elmouchi | 439/120 |
| 5,672,000 A * | 9/1997 | Lin | 362/249.06 |
| 5,675,930 A | 10/1997 | Cooper | |
| 5,910,458 A | 6/1999 | Beer et al. | |
| 5,941,018 A | 8/1999 | Herrema | |
| 6,138,405 A | 10/2000 | Matz | |
| 6,173,906 B1 | 1/2001 | Von Kerens | |
| 6,354,038 B1 * | 3/2002 | Morris | 47/33 |
| 6,416,200 B1 | 7/2002 | George | |
| 6,547,589 B2 * | 4/2003 | Magyar et al. | 439/535 |
| 6,561,674 B2 * | 5/2003 | Gibboney, Jr. | 362/253 |
| 6,644,888 B2 * | 11/2003 | Ochoa | 404/6 |
| 6,716,042 B2 * | 4/2004 | Lin | 439/110 |
| 6,880,955 B2 | 4/2005 | Lin | |
| 6,925,753 B1 | 8/2005 | Mallory | |
| D550,379 S * | 9/2007 | Hoshikawa et al. | D26/25 |
| 7,526,892 B2 * | 5/2009 | Saunders et al. | 47/33 |
| 2003/0075712 A1 | 4/2003 | Lin | |
| 2006/0150479 A1 | 7/2006 | Saunders et al. | |
| 2006/0277823 A1 | 12/2006 | Barnett et al. | |
| 2008/0217597 A1 * | 9/2008 | Foster | 256/10 |

* cited by examiner

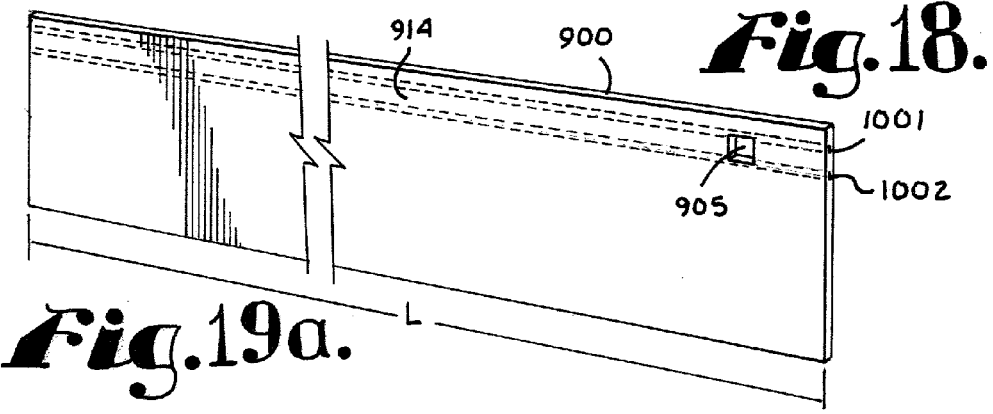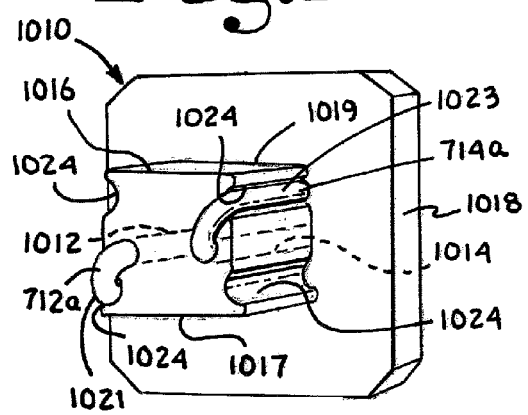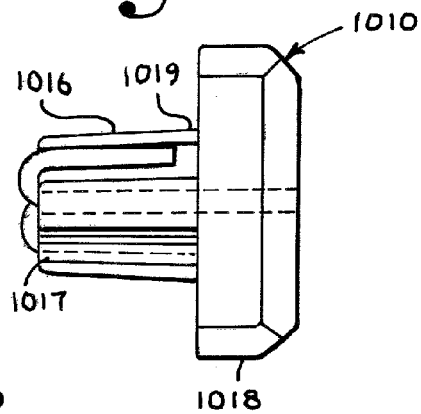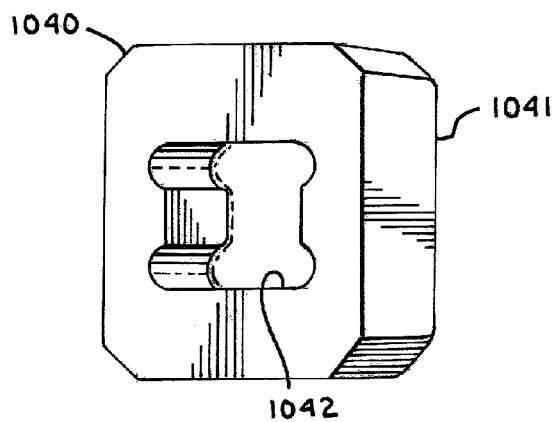

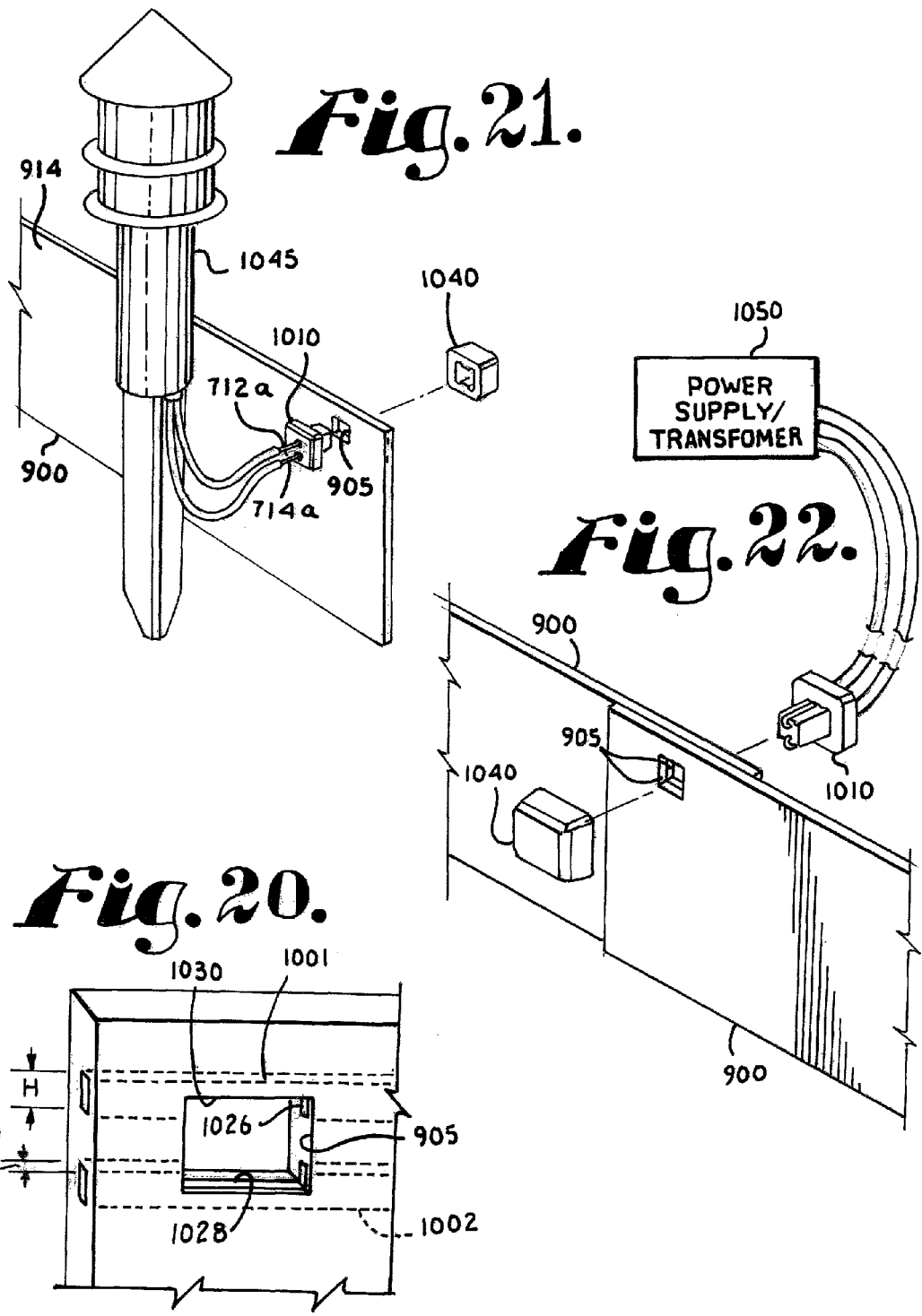

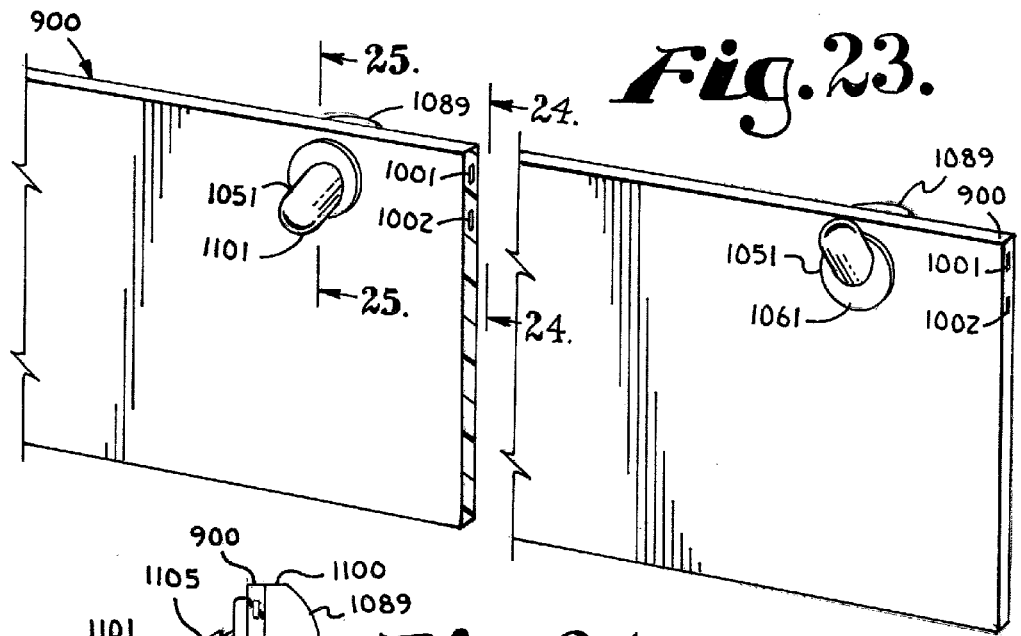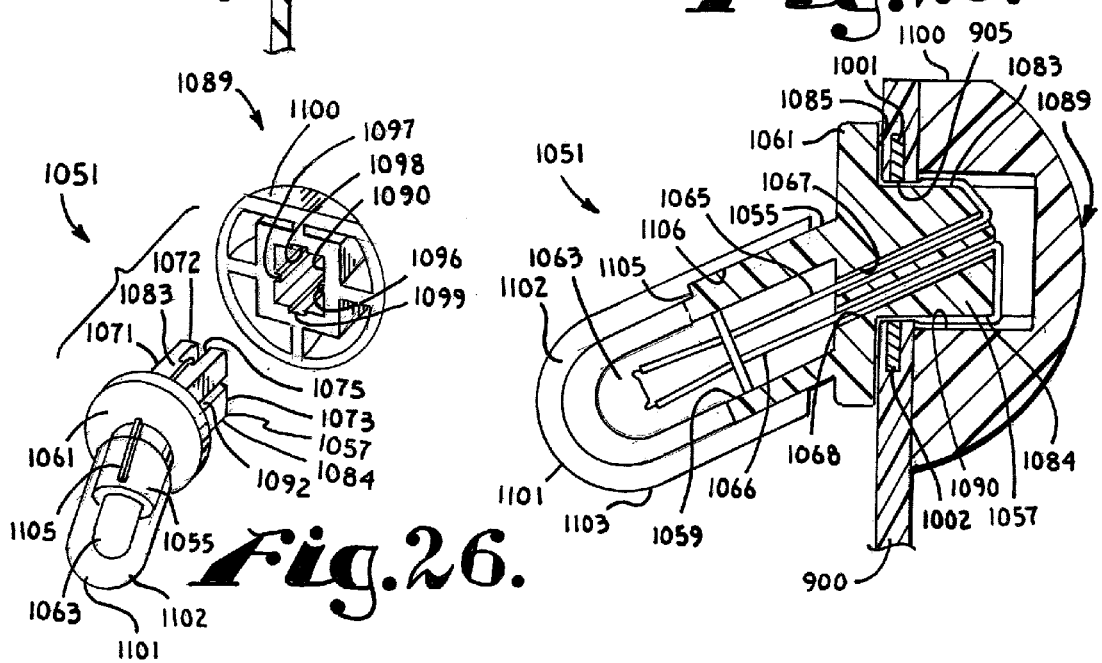

LAWN EDGING WITH INTEGRAL ELECTRICAL CONDUCTOR AND CLIP CONNECTORS

This application is a continuation in part of co-pending application Ser. No. 11/924,604 filed on Oct. 25, 2007 which is a continuation in part of co-pending application Ser. No. 11/076,372 filed on Mar. 9, 2005, which is a continuation-in-part of previously filed application Ser. No. 10/234,991 filed Sep. 4, 2002.

BACKGROUND OF THE INVENTION

1. Field of the Invention

The present invention relates to lawn and garden edging systems with integral conductors and lighting accessories.

2. Description of the Related Art

Lawn edging is typically used to provide a sharp line between two areas of diverse plant growth in a lawn. In the past a variety of edging systems have been developed.

U.S. Pat. No. 1,977,021 discloses a sheet metal edging. While sheet metal is flexible and inexpensive it tends to corrode quickly, particularly in this application where lawn and garden fertilizers are often being used.

U.S. Pat. No. 5,941,018 discloses a lawn edging system including stakes used to hold the edging in place. This patent discloses many of the common materials used for edging including molded or extruded plastic and aluminum extrudate. Each of these materials has problems. Most plastics hold up well in ground contact, but do not hold up well when exposed to UV light from the sun and to freezing conditions. Lawn edging must also be tough because lawn and garden equipment such as lawn mowers and bladed lawn edgers are often used right up next to the edging material. Most plastics are not tough enough to last more then a few seasons in this kind of abusive environment. While aluminum is tougher then plastic, it must be coated to look good and resist the corrosion of fertilizers. The coating system usually fails after just a few seasons.

It is therefore desirable to have a lawn edging system that is attractive, tough, corrosion and UV resistant, inexpensive to manufacture, and easy to install.

Prior art systems that provide embedded conductors involve the penetration of one surface of the product by a pronged bulb to make a connection. In these instances, the bulbs are not replaceable as they are traditionally soldered to the embedded conductor. To overcome this limitation, alternative prior art systems provide place-fixed bulb holders that are soldered to the embedded conductor. Spent bulbs can then be replaced as needed. However, these systems also suffer from several limitations. What is needed is a system that is inexpensive to produce, modular, flexible, and adaptable by the end user to locate lighting or other apparatus anywhere along lawn edging or at any distance therefrom. Furthermore, a system that provides ease of use in extending the length of edging is also desirable. Even further, a system that is aesthetically pleasing and includes properties to ensure safe operation and appropriate electrical characteristics for providing lighting or other power requirements is also desirable.

SUMMARY OF THE INVENTION

The present invention is directed to lawn edging in the form of edging strips including embedded electrical conductors running continuously along the length of each edging strip in spaced relation in an upper portion thereof. Holes are formed in each edging strip and sized and shaped to expose portions of the first and second electrical conductors. A plug light comprising a light socket body with a plug projecting from an opposite end thereof is insertable in each hole. A light socket is formed in the light socket body and a light source or bulb is positioned in the light socket with a pair of electrical leads extending through the light socket body and the plug. When the plug is inserted in one of the holes in an edging strip, the electrical leads are held in electrical contact with exposed portions of the first and second electrical conductors embedded in the edging strip.

A clip incorporating a pair of electrical leads associated with a power supply is insertable in another hole of the strip or an electrically connected strip to supply power to the plug light connected to the strip. Each plug light includes a transparent lens which may be tinted different colors with lenses of different tints installed on the plug lights in patterns selected to provide a desired visual appearance or thematic coloring. The light socket body of each plug light may be angled such that the direction of the light may be varied by changing the orientation of the plug light relative to the edging strip.

It is foreseen that other low voltage electrical accessories could be electrically connected to the edging strip. Although the lighting system is particularly well adapted for flexible fiberglass edging it is foreseen that it could be used with other types of flexible edging systems including coiled plastic edging or edging that is relatively inflexible.

BRIEF DESCRIPTION OF THE DRAWINGS

The present invention is further described with reference to the accompanying drawings, which show a particular construction of the present invention. However, it should be noted that the invention as disclosed in the accompanying drawings is illustrated for the purpose of explanation only. The various elements and combinations of elements described below and illustrated in the drawings can be arranged and organized differently to result in constructions which are still within the spirit and scope of the present invention

FIG. 18 is a fragmentary, perspective of a fourth embodiment of the edging;

FIG. 19a is a perspective view of a clip for use in electrically connecting a low voltage device to the edging shown in FIG. 18;

FIG. 19b is a side view of the clip as shown in 19a.

FIG. 19c is a perspective view of a cap for the clip of FIG. 19a;

FIG. 20 is a greatly enlarged and fragmentary view of the lawn edging shown in FIG. 18;

FIG. 21 is a perspective view of the fourth embodiment of the edging installed and showing a low voltage light for connection thereto;

FIG. 22 is a perspective view of a first and second section of lawn edging connectable by a clip and cap.

FIG. 23 is a fragmentary perspective view of a fifth embodiment of the edging showing low voltage light assemblies connected thereto.

FIG. 24 is an enlarged and fragmentary cross-sectional view taken along line 24-24 of FIG. 23.

FIG. 25 is a greatly enlarged and fragmentary cross-sectional view taken along line 25-25 of FIG. 23.

FIG. 26 is an enlarged and exploded perspective view of one of the low voltage light assemblies shown in FIG. 23.

DETAILED DESCRIPTION OF THE PREFERRED EMBODIMENTS

Figure 1:
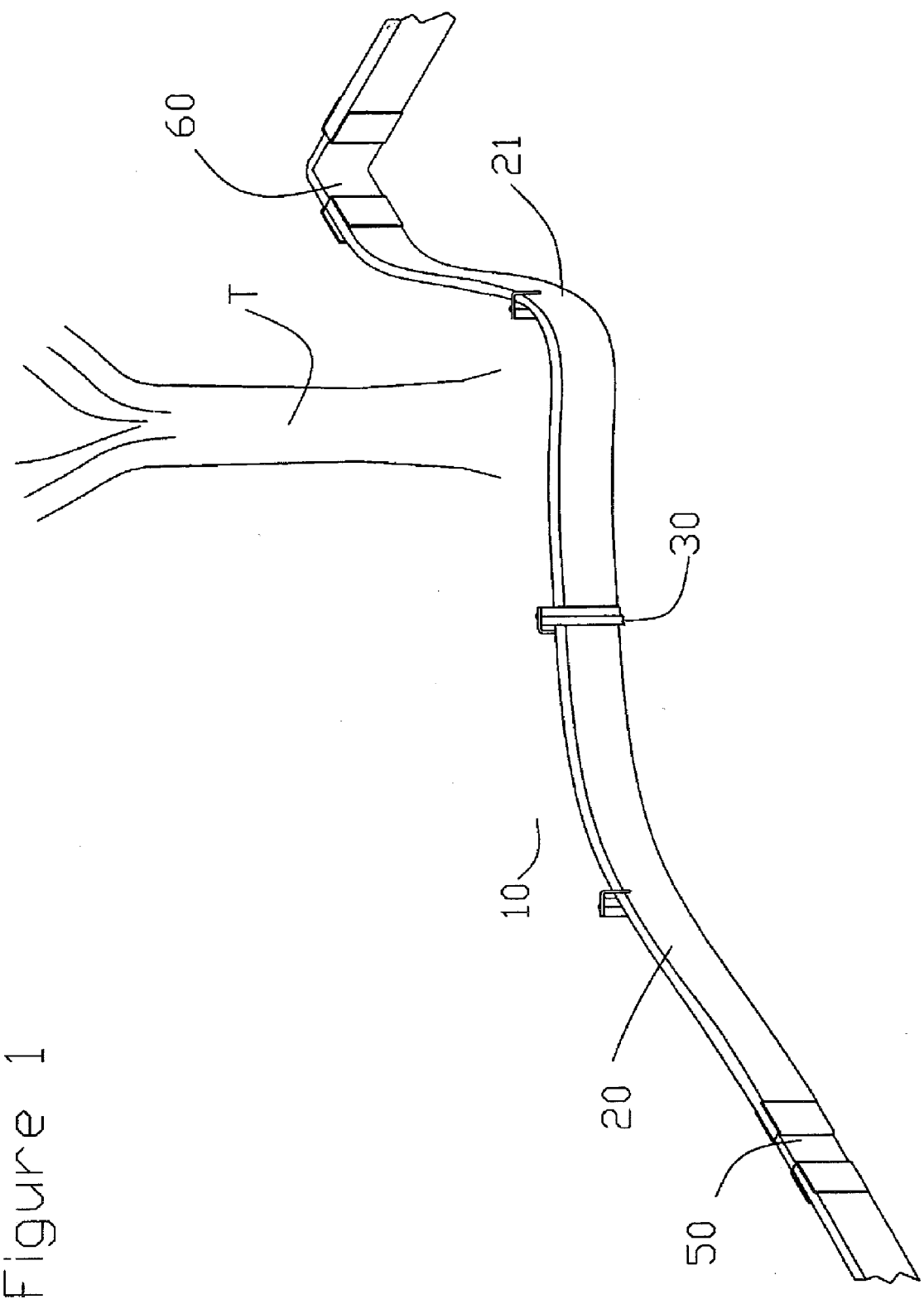
FIG. 1 is a perspective view an edging system according to the present invention installed.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words upwardly, "downwardly, rightwardly, and leftwardly will refer to directions in the drawings to which reference is made. The words inwardly and outwardly will refer to directions toward and away from, respectively, the geometric center of the embodiment being described and designated parts thereof. Said terminology will include the words specifically mentioned, derivatives thereof and words of a similar import.

FIG. 1 shows an edging system 10 installed in a typical application. The edging system 10 includes a length of flexible fiberglass edging 20. A lower portion of the edging 20 is not shown in this view as it is underground in the typical application. The edging 20 is flexible and is shown bending at a curve 21 to go around an obstacle such as a tree T. The system 10 includes stakes 30, straight connectors 50, and corner connectors 60. Although the stakes 30 can be of any conventional type, a special fiberglass stake 30 designed to match the edging 20 is shown. The edging 20 and stakes of the system 10 can be made in a variety of different colors and decorative patterns.

Figure 2:
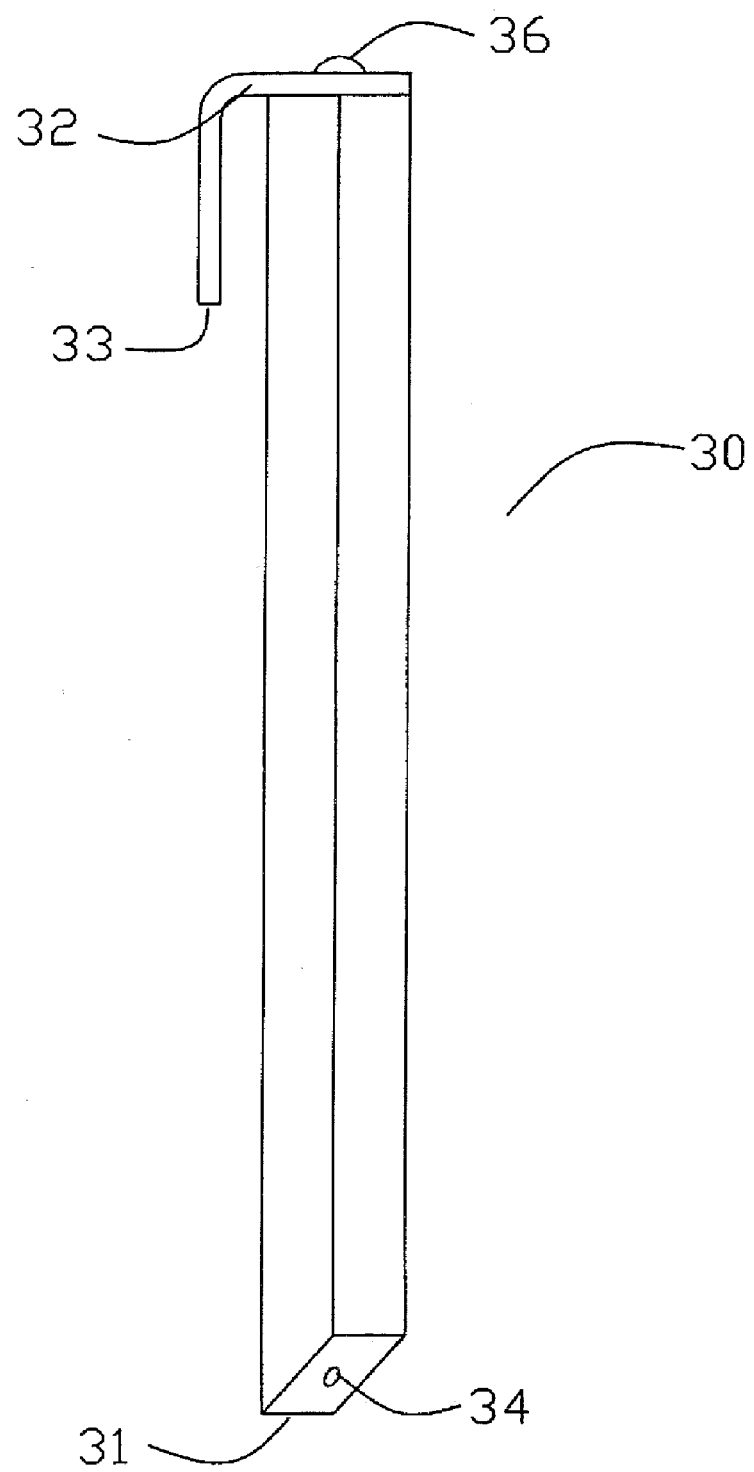
FIG. 2 is an elevation view of a stake which forms a part of the edging system.

FIG. 2 shows a pultruded fiberglass stake 30. The stake 30 has a sharpened end 31 and a hole 34 that passes lengthwise through the stake 30. A clip 32 with an extended arm 33 is held to the stake 30 by a screw or rivet 36 which uses the hole 34 as a pilot hole. For example, the stake 30 can be driven into position next to the edging 20 with the clip 32 positioned over the edging (as shown in FIG. 1) and a screw 36 can be driven into the stake 30 to hold the clip in place. This fiberglass stake 30 would have many of the same advantages stated above for fiberglass and would match the edging material 20, however any conventional stake material would also work.

The edging is formed from layers of fiberglass and a thermoset resin selected to result in a fiberglass composite strip 20 that is relatively flexible. The fiberglass composite strip should be sufficient flexibility to permit a strip of approximately 20 feet long, 4 inches tall and ⅛ of an inch thick to be coiled into a roll of approximately 12 inches in diameter.

Figure 3:
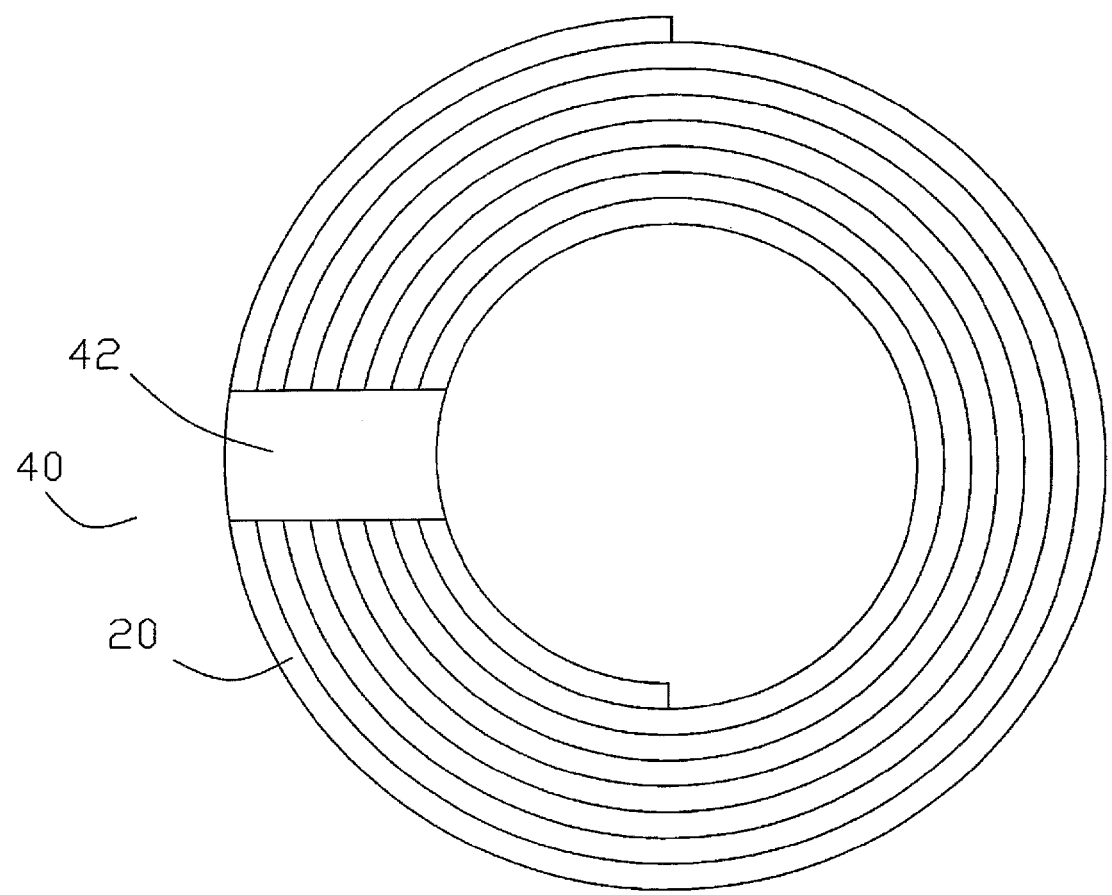
FIG. 3 is a plan view of a coil of edging material which forms a part of the edging system.

FIG. 3 shows a roll 40 of the edging 20 ready for shipping to an installation location. Forming the edging 20 into rolls 40 makes it easy to handle and ship. The roll 40 is held together with a piece of strapping tape 42. The roll 40 can be boxed or displayed in a store without a box. Typically the roll 40 might comprise a strip or the edging 20 which is twenty to one hundred feet in length.

Figure 4:
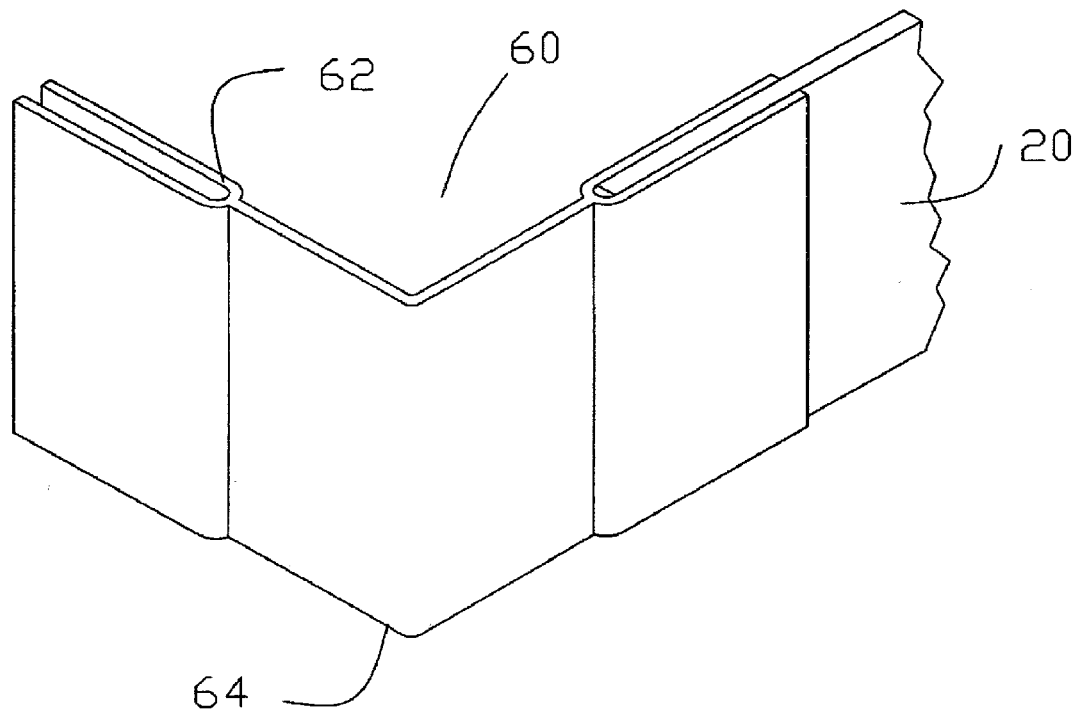
FIG. 4 is a perspective view of a corner connector which forms a part of the edging system.

FIG. 4 shows how one of the corner connectors 60 works. The connector 60 includes two slots 62, each of which is adapted to accepting an end of a respective strip of the edging 20. The connector 60 includes a bend 64 between the slots 62, which is shown as a ninety degree bend. By placing an end of a respective strip of the edging 20 in each slot 62 a sharp ninety degree bend between the strips can be created. Other bends such as forty-five degree bends would also be possible. The connector 60 allows the system 10 to include a sharp corner, whereas the pultruded fiberglass edging 20 typically can not bend at a sharp angle. The corner connector 60 can be made of pultruded fiberglass which matches the edging 20 or from an accent material.

Figure 5:
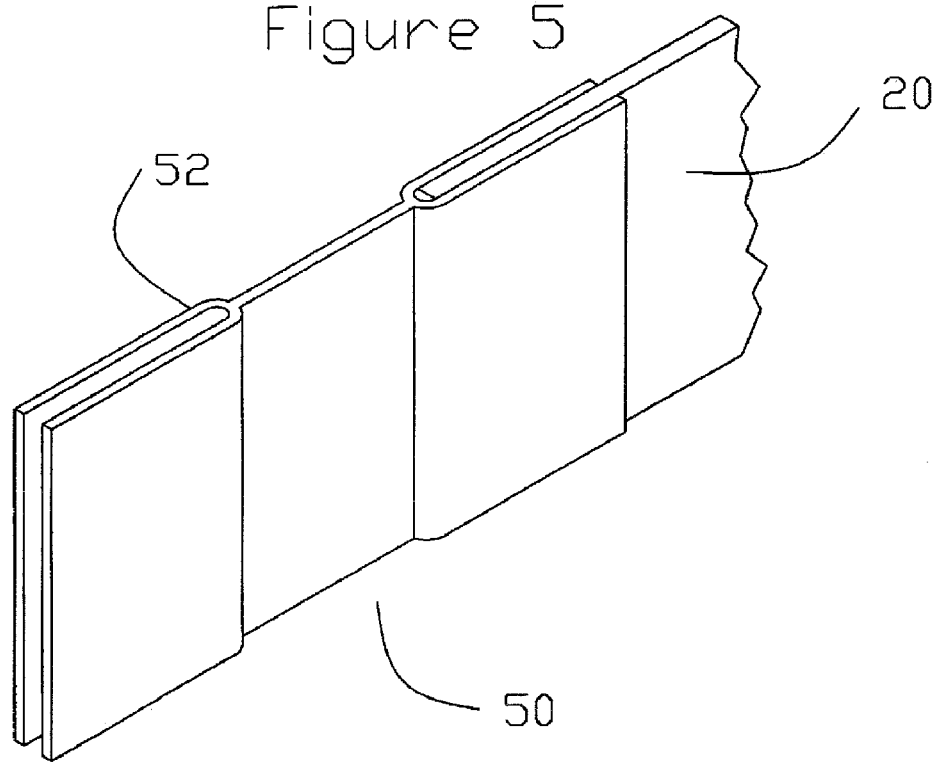
FIG. 5 is a perspective view of a straight connector which forms a part of the edging system.

FIG. 5 shows one of the straight connectors 50. The connector 50 includes two slots 52, each of which is for accepting an end of a respective strip of the edging 20. This connector allows for splicing two pieces of edging 20 together to make a long run of edging 20.

Figure 6:
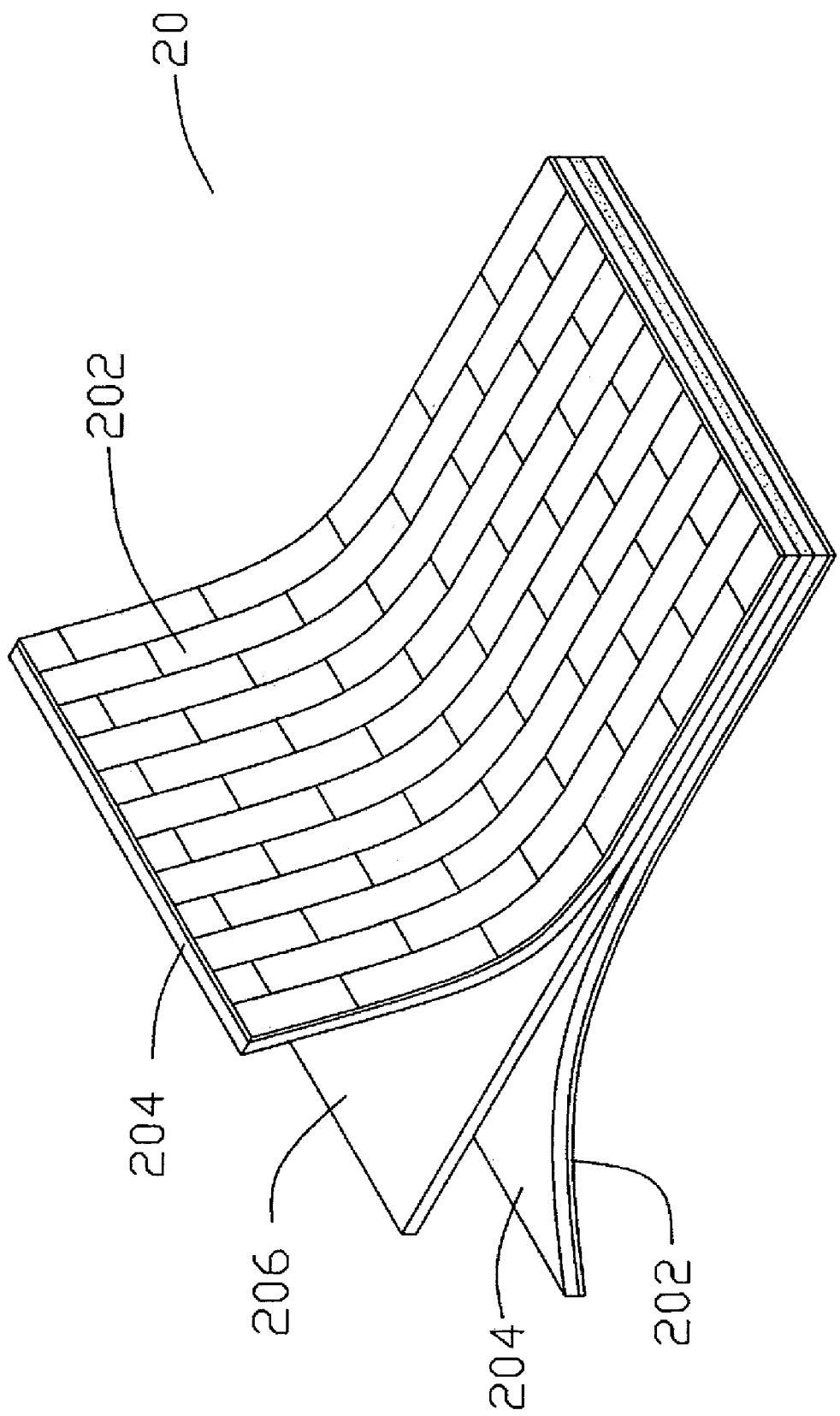
FIG. 6 is an exploded view showing the layers of the edging.

FIG. 6 shows an exploded view of the layers of the edging 20. The edging 20 includes exterior veil layers 202 on both sides. The veil layers 202 are formed of a polyester material that can be printed with patterns to give the edging 20 the appearance of any desirable material such as brick (as shown), stone or wood. Positioned inwardly from the veil layers 202 are continuous strand mat layers 204 which consist of a thin mats of randomly oriented fiberglass strands. A center or "rovings" layer 206 is sandwiched between the continuous strand mat layers 204. The rovings layer 206 consists of a mat of long fibers oriented parallel to the length of the edging material 20.

Figure 7:
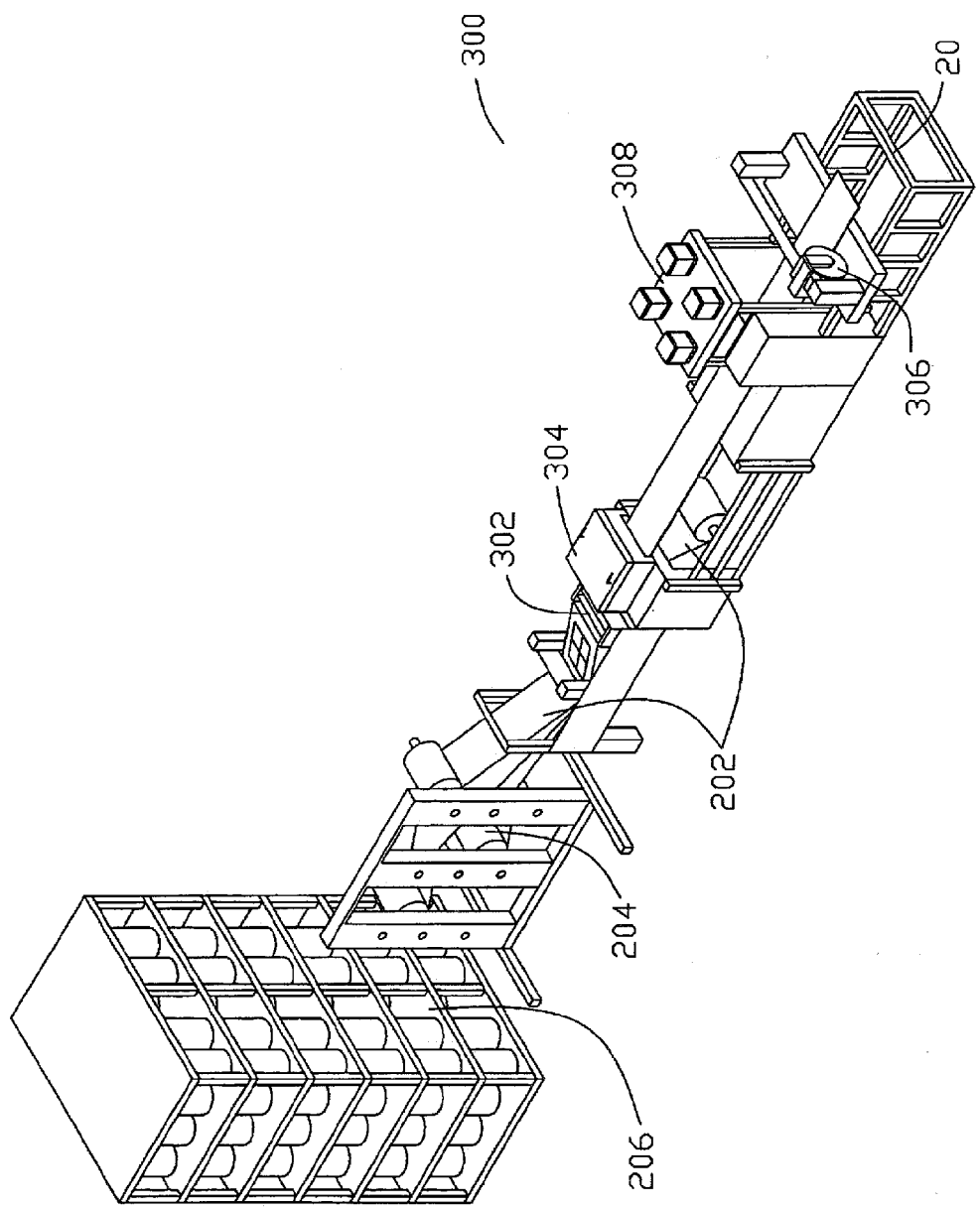
FIG. 7 is a perspective view showing the process for manufacturing the edging.

Referring to FIG. 7, in the manufacturing process 300, the unidirectional rovings layer 206 is sandwiched between the two continuous strand mats 204 and this assembly is pulled through a vat of thermoset resin 302. The veil 202 is then applied to both sides and the assembly is pulled through a heated die 304. The lengths of edging 20 are cut by a cut off saw 306 as the material comes out of the puller 308. In use, a trench one to two inches deep is dug where the system 10 is to be installed. One end of a roll 40 of the edging 20 is placed at the desired beginning of the edging trench (not shown) and secured by driving a stake 30 down beside the edging 20 as shown in FIG. 1. The edging 20 is then unrolled and staked at intervals of a few feet. For long runs involving multiple rolls 40, the straight connectors 50 can be used to provide an attractive splice, or if desired the ends of two rolls 40 can simply overlap to create an attractive, continuous boarder. At locations where a tight ninety degree bend is required, such as where two sidewalks come together, a corner connector 60 can be used. The edging 20 can be cut to length using tools used to cut conventional metal edging such as tin snips or a hack saw.

Second Embodiment

Figure 8A:
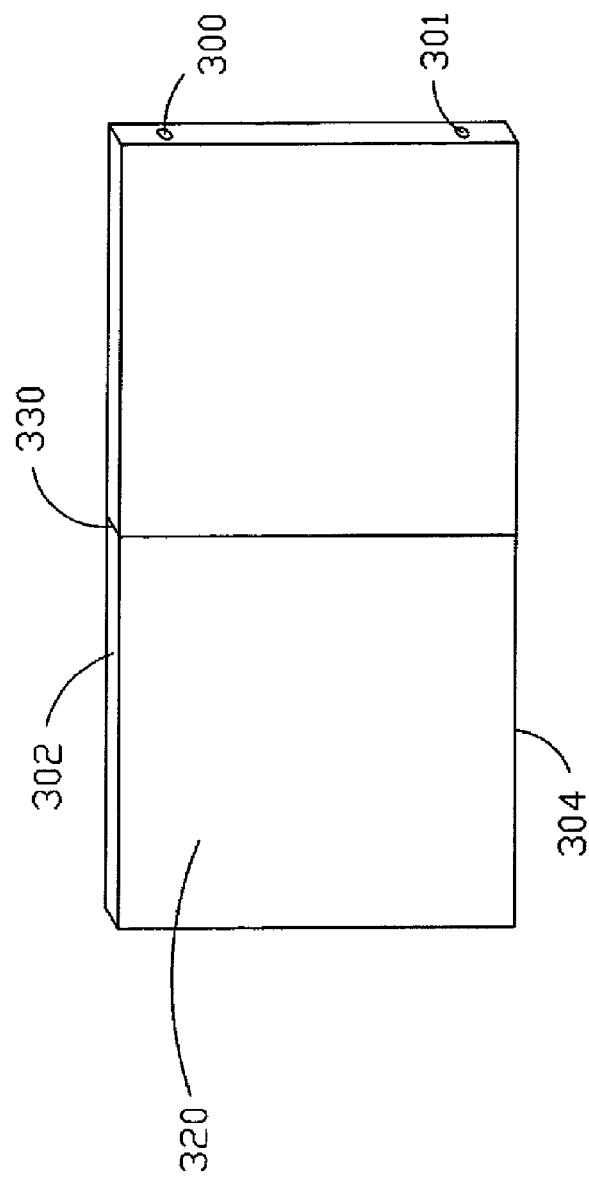
FIGS. 8a and 8b are perspective views of a second embodiment of the fiberglass edging having electrical conductors embedded therein.

FIGS. 8a-13 show details of a second embodiment 320 of the lawn edging of the present invention. The edging 320 includes one or more electrical wires or conductors 300,301 which are embedded in the edging 320 and are usable to supply electric current from a power source (1000 in FIG. 16) to low voltage outdoor lighting or for other applications or curcuits. For example, FIG. 8a shows a pultruded fiberglass edging 320 having a pair of electrical conductors or wires 300,301 formed therein. One conductor 300 is located near a top edge 302 of the edging 320 and a second conductor 301 is located near a bottom edge 304 of the edging 320. The conductors 300,301 can run the full length of the edging 320. The electrical conductors 300,301 may be formed of metal wire, such as copper wire. Alternatively, both conductors or wires 300,301 may be embedded in the edging 320 in closely spaced and parallel relation near the top edge 302, near the bottom edge 304, or anywhere in between.

The conductors 300,301 can each replace one of the continuous strands in the rovings layer 206 that would otherwise be pultruded into the edging 20, so that uniform thickness of the edging may be maintained. For example, the edging 20 described above without inclusion of the copper wire 300 may include 24 strands of glass. If two copper wires 300 are utilized, two strands of glass would be removed, leaving 22 strands of glass and 2 copper wires in the edging 320. Producing edging 320 of uniform cross-section which is relatively thin and flexible and facilitates packaging, storing and display of the edging 320.

Fiberglass edging 320 is generally very tough but can be subject to crushing from a blow applied to an edge such as the top edge 302 during installation. If positioned near the top edge 302 and the bottom edge 304 of the edging 320, the wires 300,301 can also act as structural supports to strengthen the edges and lessen damage which might be caused when the edging 320 is driven into the ground. It has been found that a copper wire 300 on the order of 1/32 to 1/4 inch in diameter is capable of strengthening the top edge 302 of the edging 320 to lessen damage to the edging 320 caused when a user drives the lawn edging 320 into the ground and yet is sufficiently small and flexible to be capable of being pultruded into the edging 320 as the edging is formed by the fiberglass pultusion process discussed above.

The fiberglass edging 320 can be in a thickness range of 1/16 inch to 3/8 inch and is more preferably in a range of 1/8 inch to 3/16$^{th}$ inch thick. The wire can be in a range from 1/4 the thickness of the edging up to just under the overall thickness of the edging. A more preferred range would be a wire diameter 1/8 to 1/2 the thickness of the edging 320 to give ideal strength, flexibility and manufacturability of the wire and of the resulting edging 320.

Figure 8B:
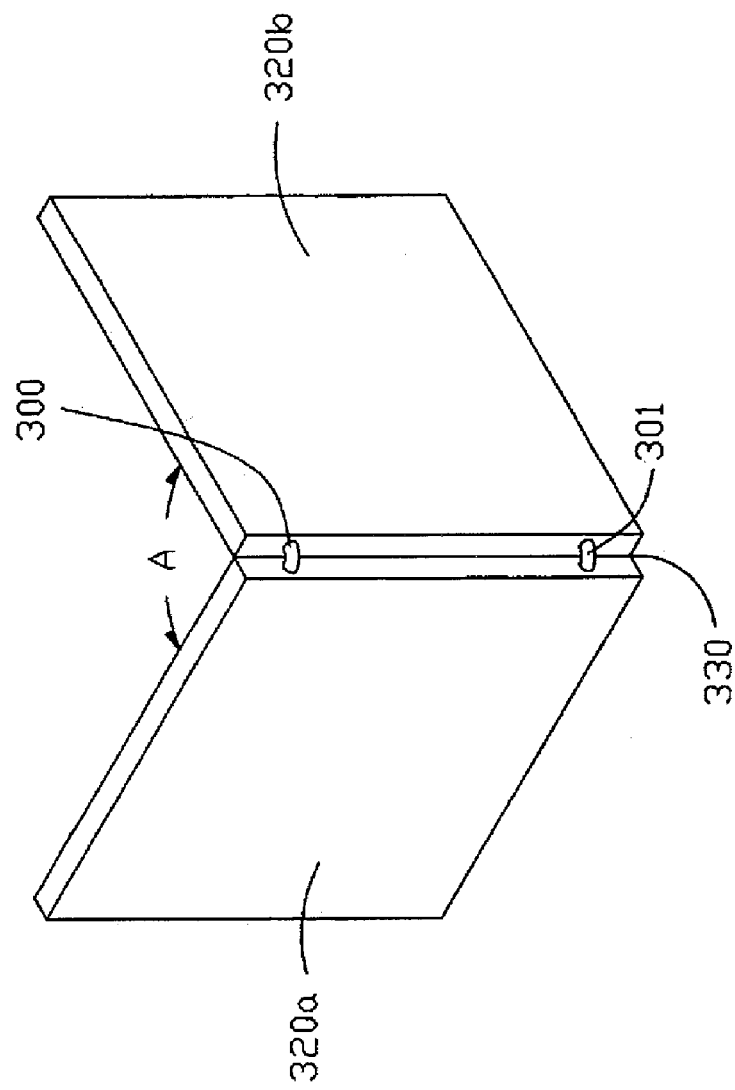

FIG. 8b shows that if the edging 320 can be scored with a knife or saw along line 330 the edging 320 can be folded into two pieces 320a and 320b. The two pieces 320a and 320b can be hinged to any angle A desired by the user and still maintain a wire connection between the two pieces 320a and 320b. The result is a living hinge formed by wires 300,301.

Figure 9A:
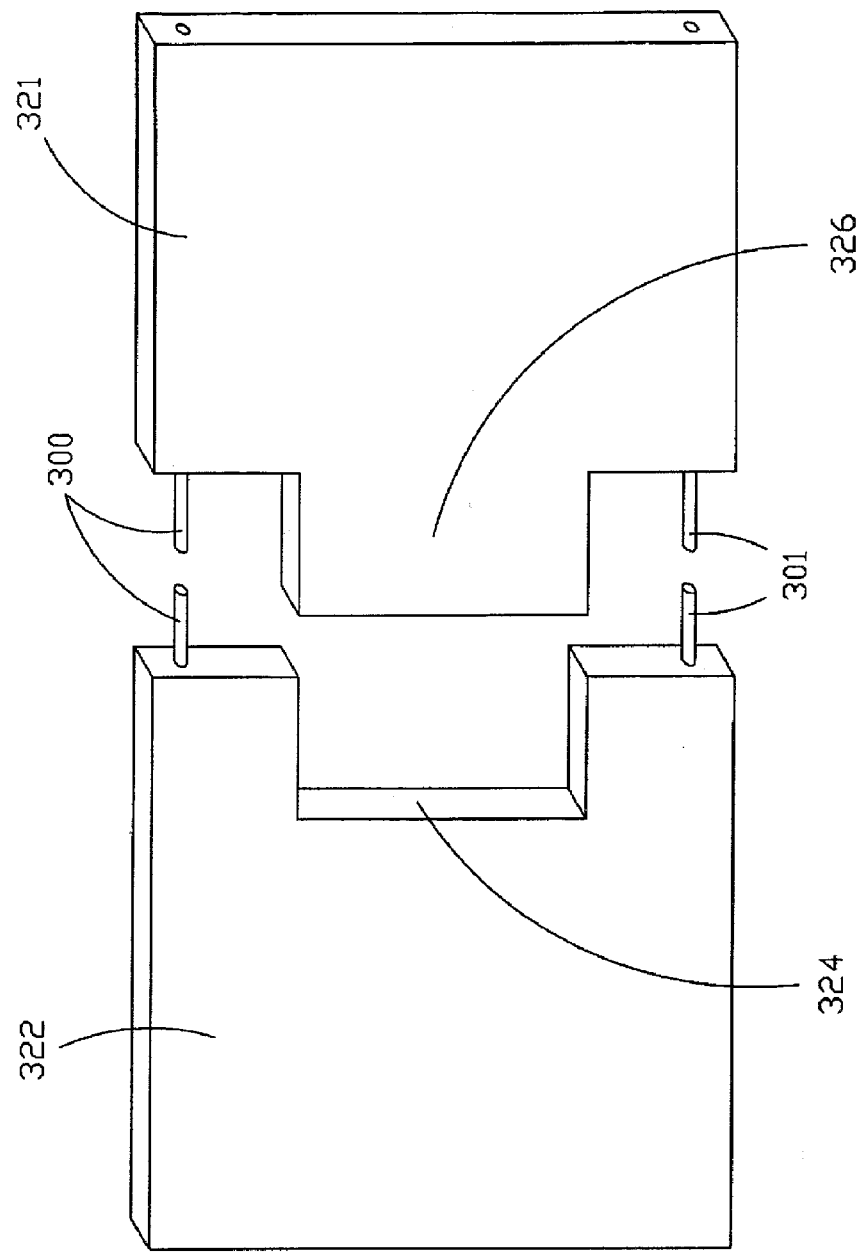
FIGS. 9a and 9b are perspective views showing a first method of connecting the conductors of the second embodiment of FIGS. 8a and 8b.
Figure 9B:
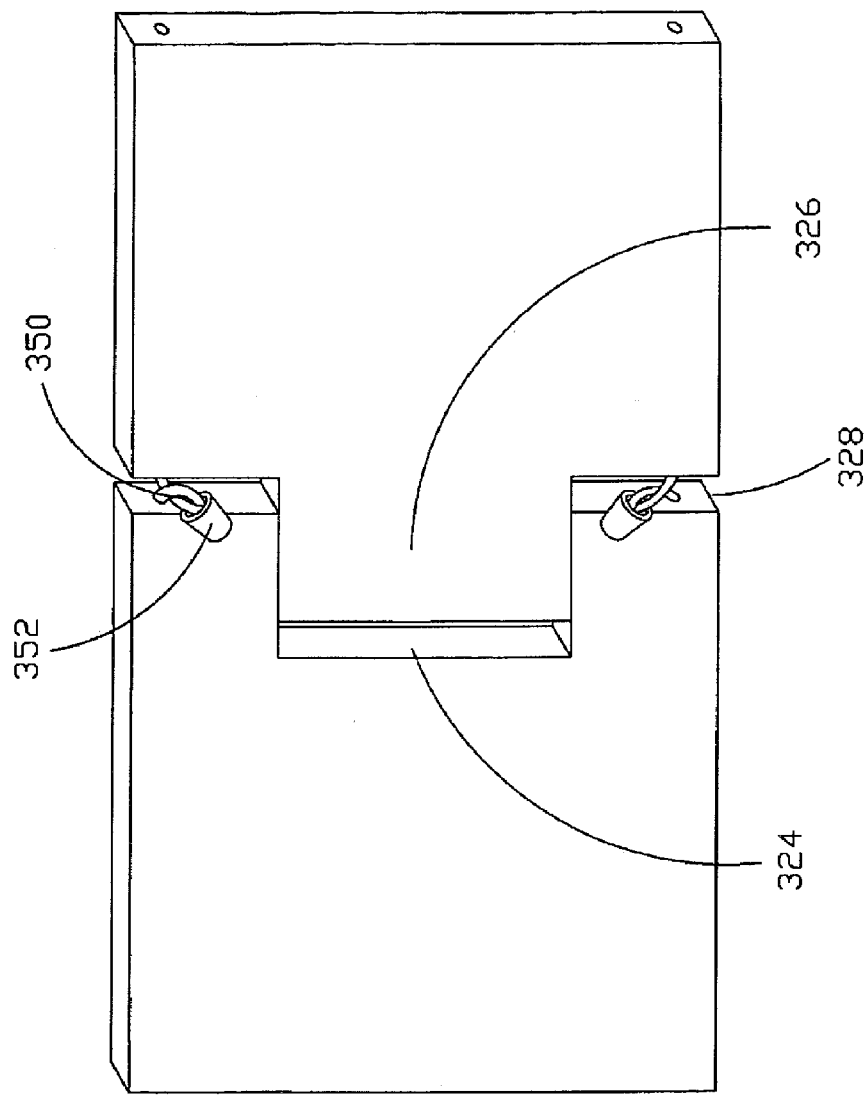

FIGS. 9a and 9b show that the wires 300, 301 can be used to connect two edging pieces 321 and 322 together. FIG. 9a shows two pieces 321 and 322 that are to be joined together. Fiberglass material can be cut away to expose ends of wires 300, 301 and cooperating male tab 326 and female notch 324 can be formed into the ends of edging pieces 321 and 322.

FIG. 9b shows that the tab 326 and notch 324 can be joined to form a connection that can be secured be tying wires 300, 301 together to form a wire tie 350. The wire tie 350 can be formed with or without using a wire connector 352. The two pieces 321 and 322 can represent two full length pieces that are to be spliced together or the two pieces 321, 322 can represent a repair or a splice needed for any reason.

Figure 10:
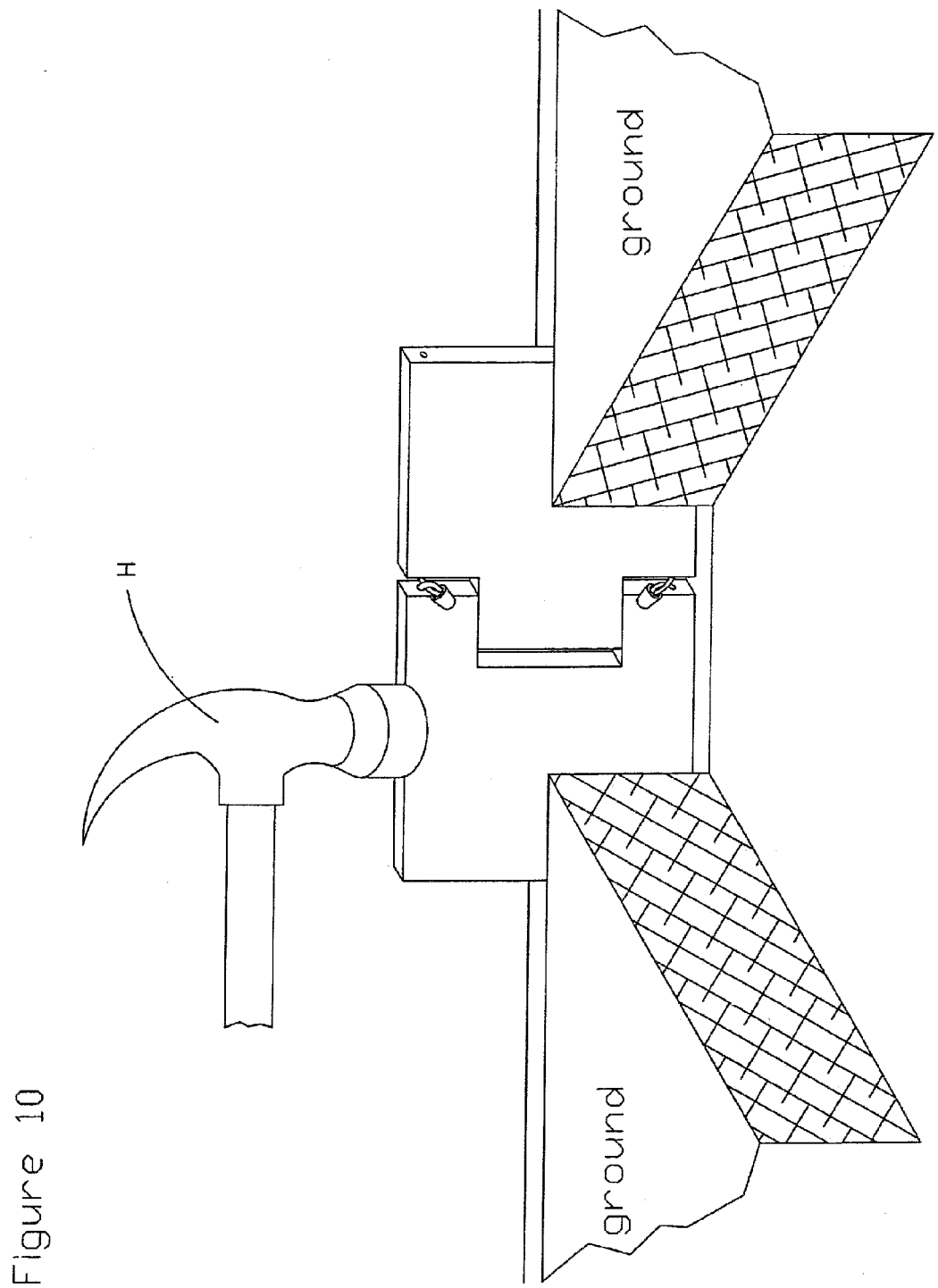
FIG. 10 is a perspective view showing the second embodiment of FIG. 8 being installed.
Figure 11:
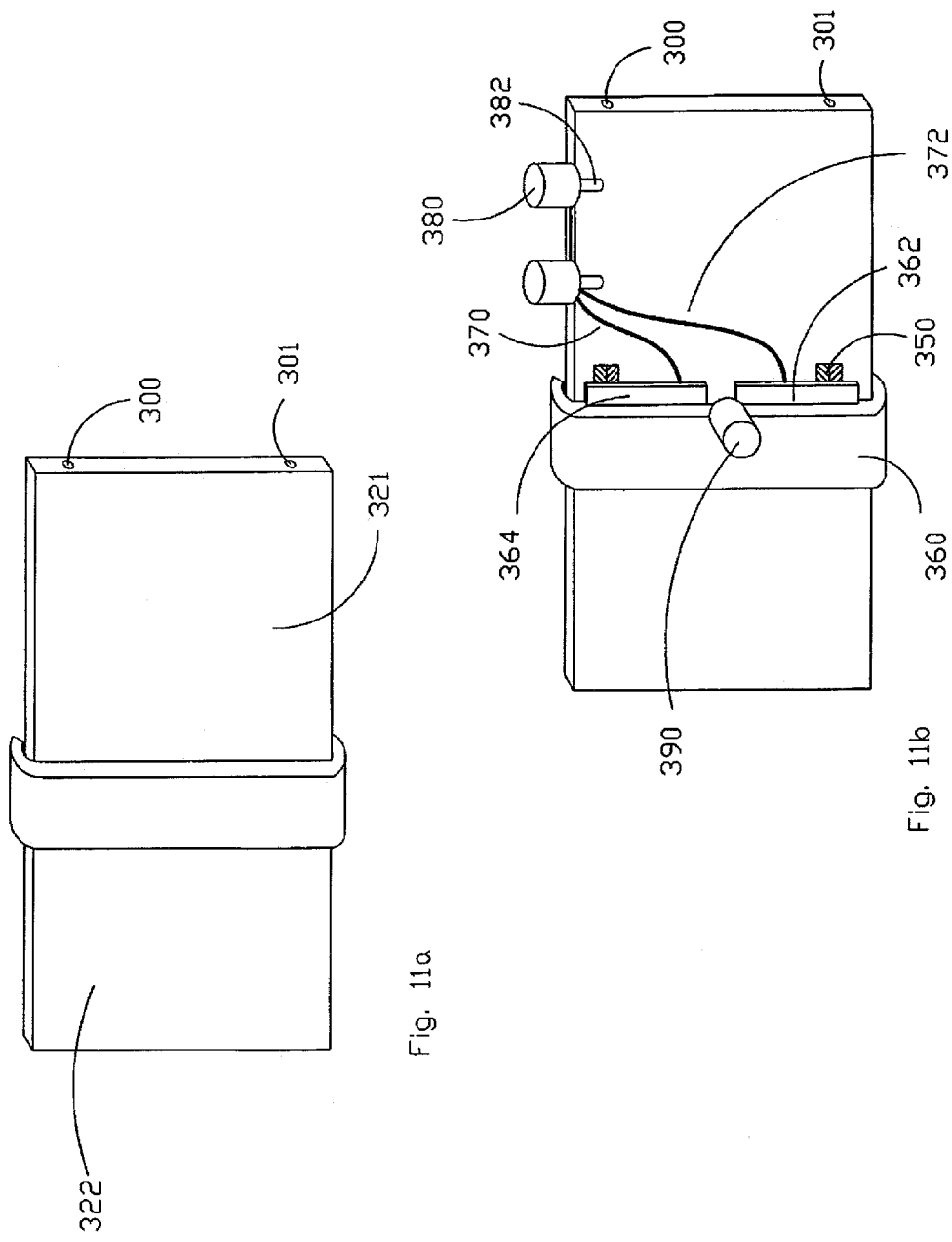
FIG. 11 is a perspective view showing a first clip which can be used to join sections of edging made according to the second embodiment.

FIG. 10 illustrates how the spliced pieces 321 and 322 form a complete edging that can be driven into a groove G in the ground using hammer H.

FIGS. 11a and 11b show further details of the second edging embodiment. A clip 360 can hold together the two edging pieces 321 and 322 and cover the joint 328 between them. The clip 360 can slide onto either piece 321, 322 and can slide over the wire tie 350 where wire connector 352 is not used. The clip 360 can include contacts 362 and 364 that can be used to conduct low voltage electricity to or from the wires 300, 301. As shown, contacts 362 and 364 can conduct low voltage electricity to a light or LED 390 on the clip 360 or the contact 362 can supply one polarity of low voltage DC electricity to wire 372 and contact 364 can conduct an opposite polarity to power lights 380 clipped 382 to the edging pieces 321,322. This arrangement could be used for solar lawn lights, Christmas lights or for low voltage Malibu lights for example. The arrangement can be used to conduct low voltage electricity for any purpose. The clip 360 can serve to connect the two pieces 321, 322 to protect the wire tie 350 and to connect the wire ties 350 to conduct electricity for lighting or other purposes. The arrangement provides for lawn edging and for an electrically conductive flexible fiberglass strip where the fiberglass and the outer veil electrically insulate the wires 300,301 inside the edging pieces 321, 322.

Figure 12:
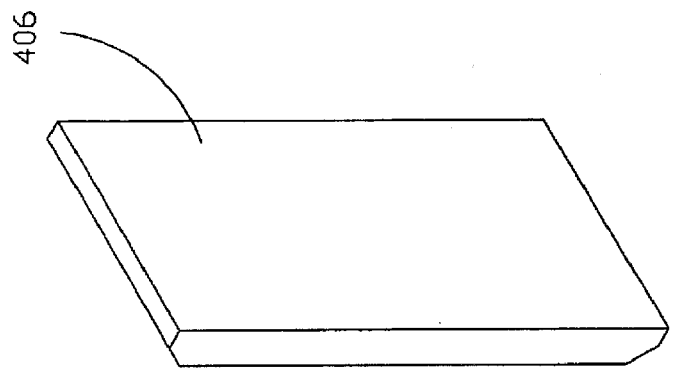
FIG. 12 is a perspective view showing a second clip which can be used to join sections of edging made according to the second embodiment.
Figure 12:
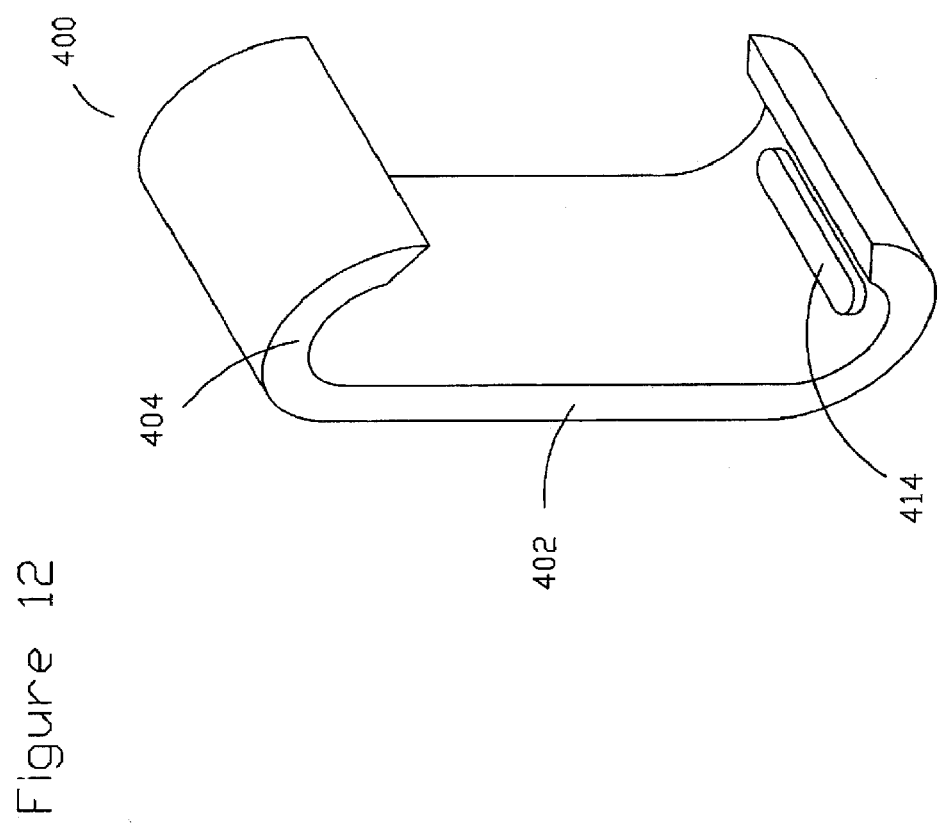

FIG. 12 shows an alternate clip 400. The alternate clip 400 is a two piece design with a slider 402 that can fit over the edging pieces 321, 322 and a wedge 406. The slider 402 can include grips 404 that allow the slider 402 to fit over edging pieces 321, 322 while still allowing it to slide along the edging. The wedge 406 has a height taller than the opening between the two grips 404 such that it can wedge against the edging piece 321,322 to hold the pieces 321, 322 and clip 400 together. The clip 400 can include metal contactors 414 such as foil. The clip 400 can be extruded from fiberglass or could be plastic or metal.

Figure 13:
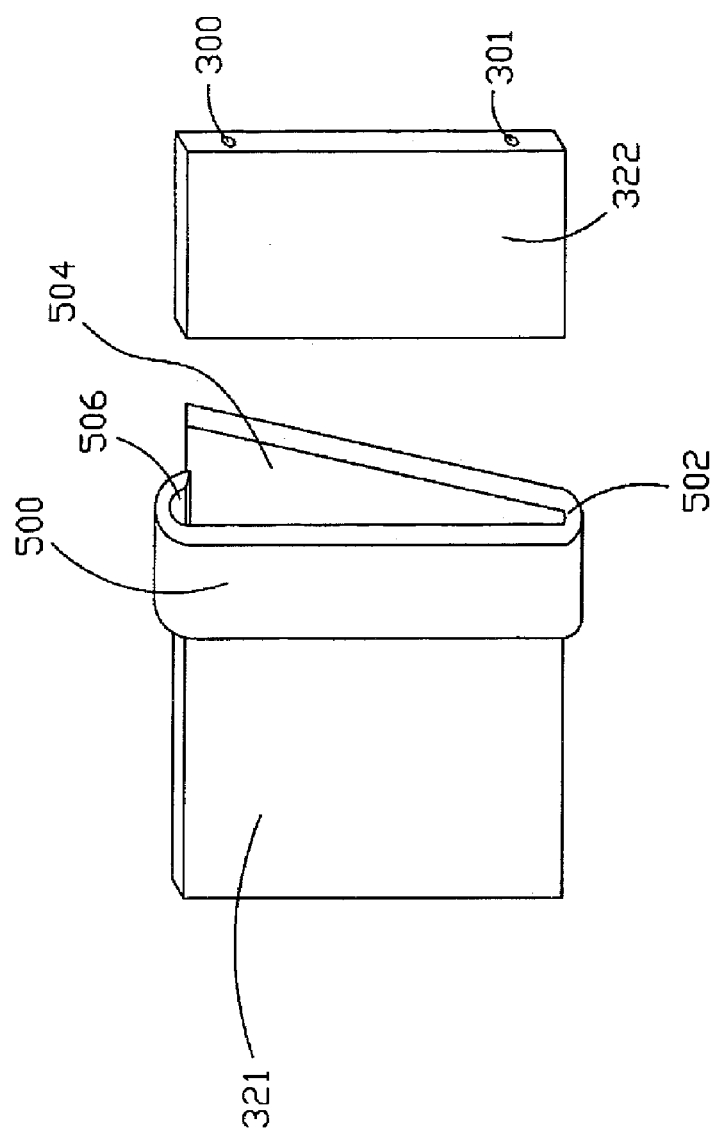
FIG. 13 is a perspective view showing a third clip which can be used to join sections of edging made according to of the second embodiment.

FIG. 13 shows a third clip 500. The clip 500 can be formed from plastic and can include a living hinge 502. The clip 500 can include a long leg 504 that can cooperate with a hook portion 506 to lock the clip 500 around the edging 321 to couple one edging piece 321 to edging piece 322. This clip 500 could also function to connect edging 20.

Figure 14:
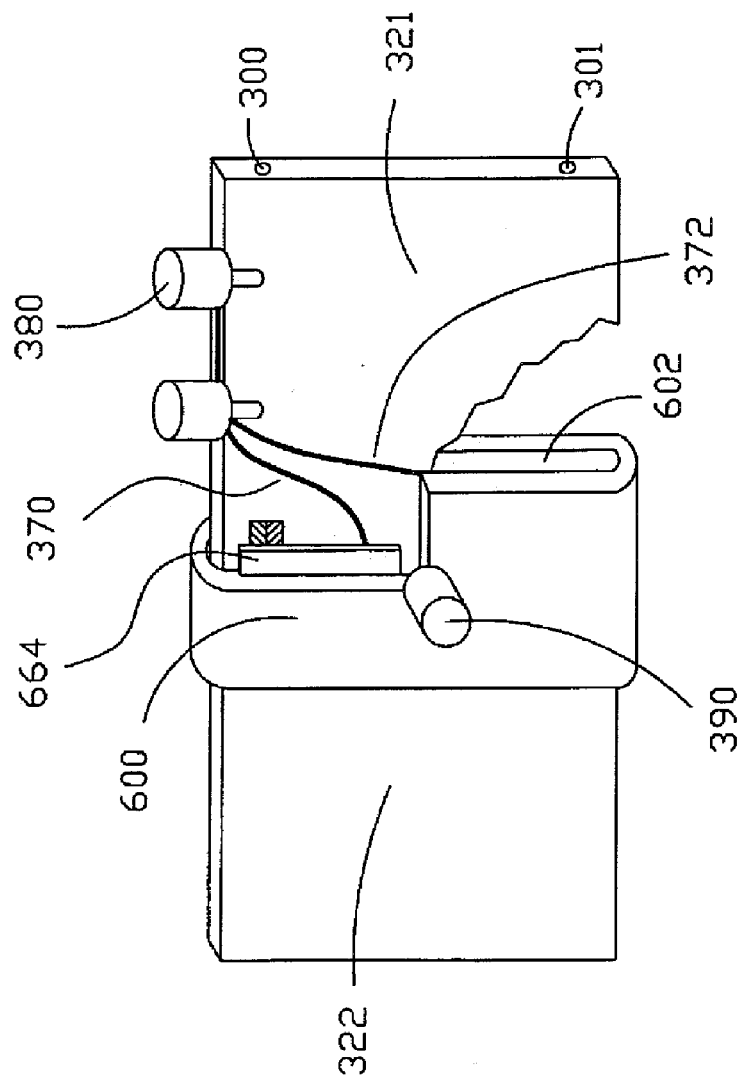
FIG. 14 is a perspective view showing a fourth clip which can be used to join sections of edging made according to of the second embodiment.

FIG. 14 discloses a fourth clip 600. The clip 600 forms an entire loop that can slide over the edging pieces 321, 322. The clip 600 can also carry electrical contactors 664 and wires 370, 372 to electrically connect the wire tie 350 to the lights 380 and/or 390. The clip 600 can have an opening 602 that can fit tightly over the profile of the edging pieces 321, 322 such that they will be frictionally held together and such that the electrical contacts 664 will be covered and held tight against the wire tie 350. Electrically connected lights 380 can be spaced out along the length of the lawn edging pieces 321, 322.

Figure 15:
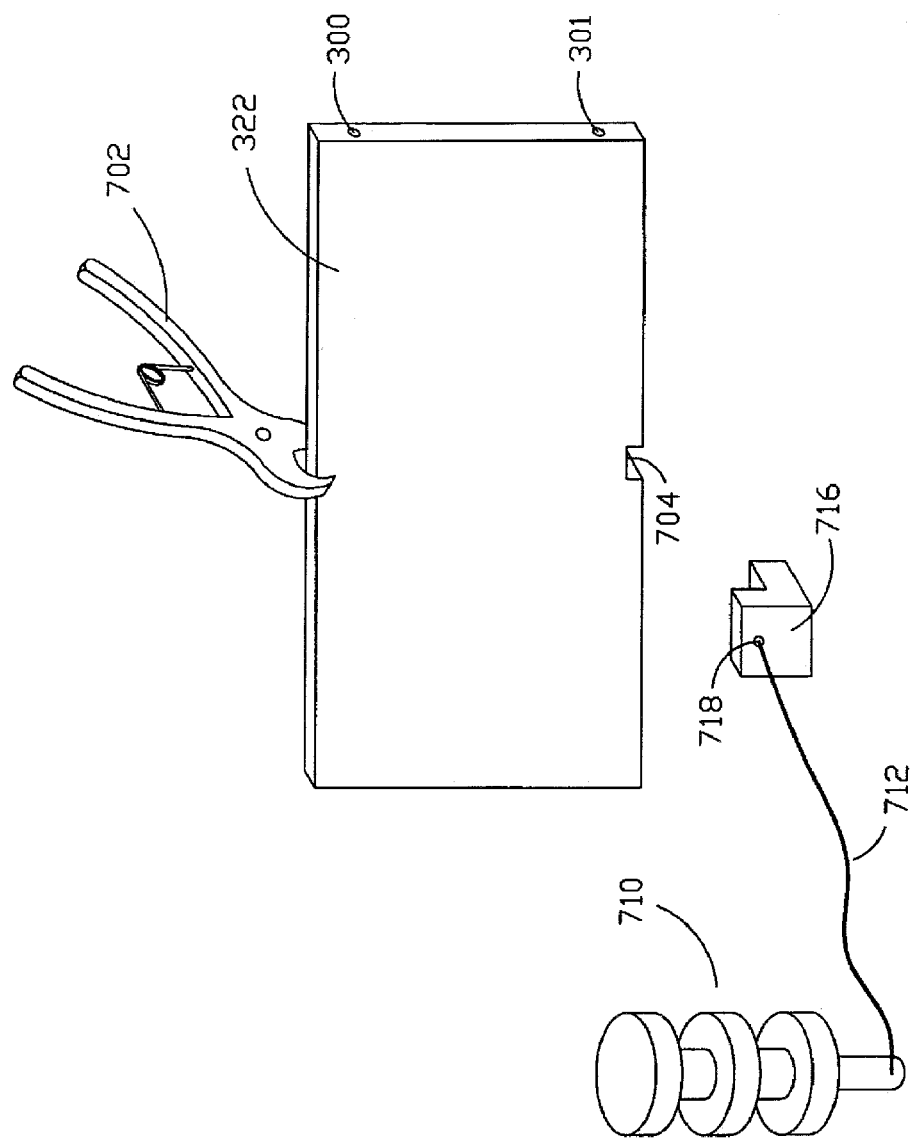
FIG. 15 discloses details of additional applications.

FIG. 15 shows edging piece 322 having wires 300, 301 running along its length. In order to connect to the wires 300, 301 a notch 704 can be cut using cutters 702. The notch would expose a portion of wires 300 or 301. This could allow for electrical connection to the wires 300,301. A wire 712 to power a Malibu light 710 can end in a clip 716 that has an electrode 718. The clip 716 can press fit into the notch 716 with the electrode 718 making electrical connection to the wire 301 to allow low voltage electricity carried by the lawn edging piece 322 to flow to the Malibu light 710 which can be staked in the ground adjacent the lawn edging.

Third Embodiment

Figure 16:
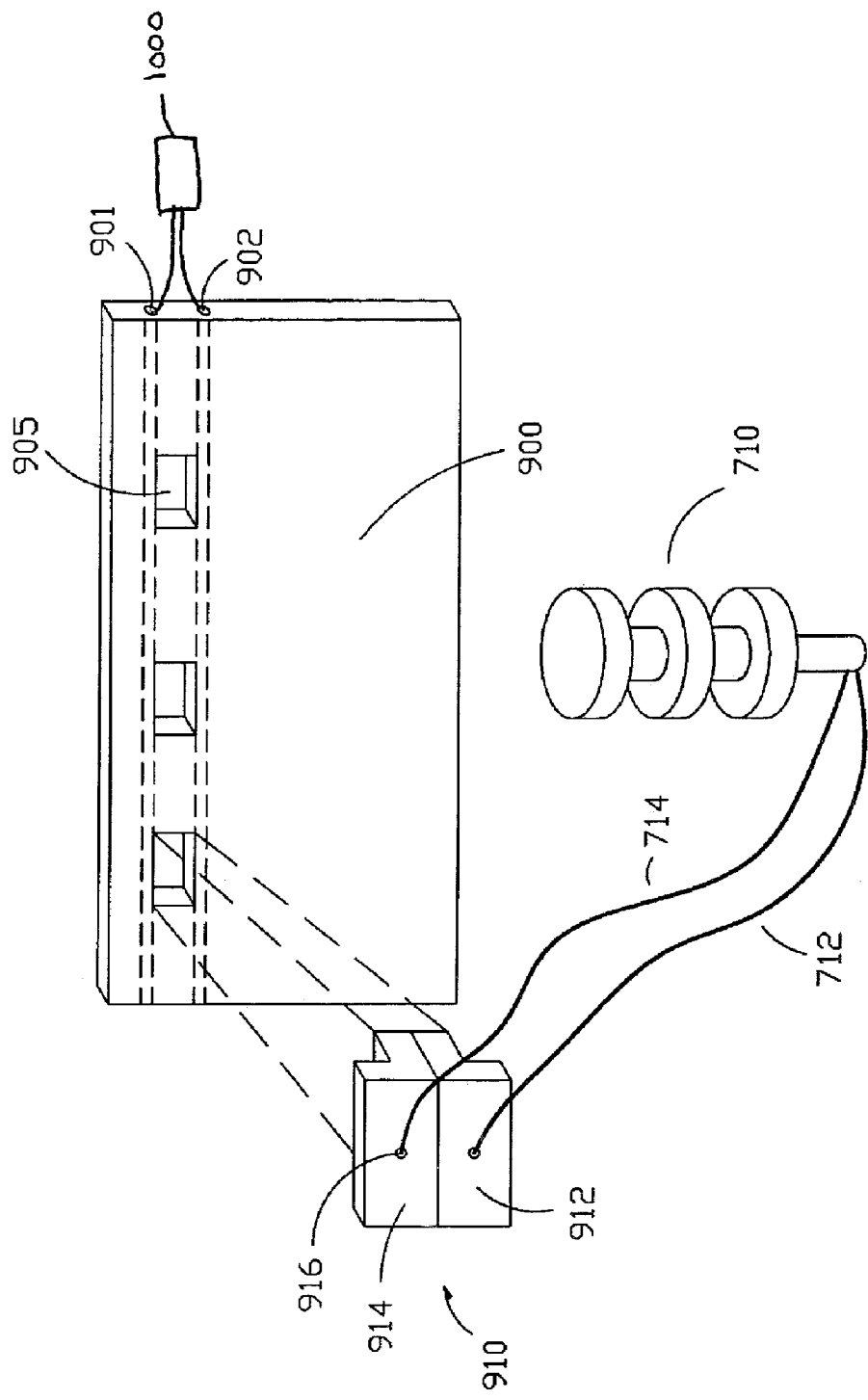
FIG. 16 discloses a third embodiment of the edging.

FIG. 16 discloses an alternate embodiment of the lawn edging 900. This thin fiberglass edging can include a plurality of holes 905 punched through the edging 900. These holes 905 could be formed in the edging 900 as part of the manufacturing process. The edging 900 also includes two wires 901, 902 which can be electrical conductors as well as serving to strengthen the upper portion of the edging 900. In the preferred embodiment, the electrical conductors or wires 901, 902 are located in the upper quarter of the edging 900 or approximately within one inch from the top edge of the edging 900 such that the wires 901, 902 extend above the ground when the edging 900 is installed. At installation, the wires 901, and 902 can carry low voltage DC current to power lawn mounted electrical devices such as Malibu light 710.

A clip 1010 can be press fit into the hole 905. The clip can consist of an upper portion 914 and a lower portion 912 each having an opening 916 through which passes a wire 712, 714. With the clip 1010 pressed into the hole 905 electricity can pass from a power source 1000 through the wires 901, 902 to the wires 712, 714 and on to light 710 making a complete electrical circuit.

Figure 17:
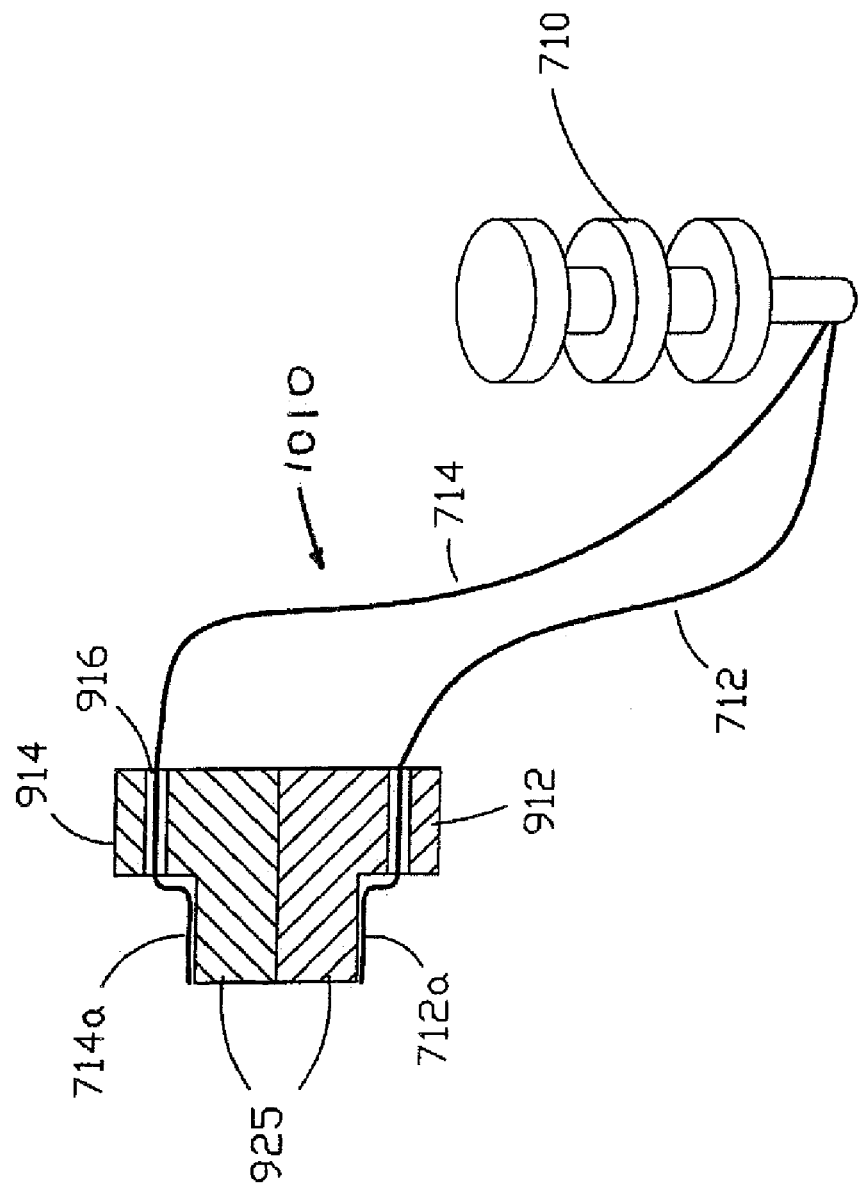
FIG. 17 shows details of the third embodiment of FIG. 16.

FIG. 17 shows a section view of the clip 1010. The wires 712 and 714 each end in an electrical contact or contactor 712a and 714a. The clip 1010 can include a plug portion 925 sized to press fit into hole 905. The plug portion 925 can include a one way device such as prong 930 that will engage the hole 905 to restrict removal of clip 1010 once plug portion 925 is inserted into hole 905. The clip 1010 can be molded from any non-conducting material such as plastic, fiberglass, rubber or polyester. A flexible plastic may provide the best fit.

Fourth Embodiment

FIG. 18 illustrates a fourth embodiment of the lawn edging 900, having one or more holes 905 punched therethrough or formed therein. The edging 900 includes two substantially flattened conductors 1001, 1002, forming an elongate cuboid with a length L that extends through the length of the edging 900, a height H, and a depth D. The flattened conductors 1001, 1002 may also serve to strengthen an upper portion 914 of the edging. It should be noted that upper, lower, top or bottom as used herein are references relative to the normal orientation and attitude of use of a lawn edging material. The conductors 1001, 1002 carry low voltage DC current to power electrical apparatus such as landscape lighting, outdoor speakers, and the like.

As used herein the term cuboid is intended to include wire of rectangular cross-section. In the preferred embodiment the cuboidal wire is flattened so that the wire is taller than it is wide relative to the strip of edging 900 in which it is embedded. The wire may also be referred to as a flattened wire or conductor and the wire does not have to be truly rectangular in cross-section. It is simply preferable that the wire is taller than it is wide as oriented in the strip of edging as typically installed in a normally, vertical orientation. It is to be understood that the wire could have planar, parallel front and rear surfaces with rounded upper and lower edges. It is also foreseen that the wire could have an ovate cross-section. Using flattened wires or conductors 1001 and 1002 facilitates forming a hole 905 in the edging 900 such that the wires 1001 and 1002 will be exposed without removing too much of the wires 1001 and 1002 to adversely affect the performance of the wires. In addition, using flattened wires 1001 and 1002 reduces the size of any bulges or the like formed by displacement of fiberglass material around the conductors 1001 and 1002.

FIG. 19a, illustrates a clip 1010 of the present invention. The clip 1010 having a substantially T-shaped cross-section as generally shown in FIG. 19b comprises an elongate shaft portion 1016, a breech or head portion 1018 and bores 1012, 1014. The shaft portion 1016, having a proximate end 1017 an opposed distal end 1019 that abuts the head portion 1018, is sized and shaped so as to friction fit into the hole 905 in the edging 900. The head portion 1018 is so sized and shaped so as to circumscribe and overlap the hole 905, so as to prevent the clip 1010 from passing completely through the hole 905. The bores 1012, 1014 extend through the elongate shaft portion 1016 and the head portion 1018 and are adapted to receive electrical contactors, 712a and 714a.

FIG. 19c illustrates a cap 1040 for the clip of FIG. 19a. The cap 1040 is sized and shaped so as to friction fit over the shaft portion 1016, to secure the clip 1010 in place and in other instances to secure two sections of edging 900. In the preferred embodiment of the present invention, the cap 1040 is defined by generally U-shaped cross section, a closed end 1041 and a cavity 1042. The cavity 1042 is so sized and shaped as to receive a portion of the shaft portion 1016. Note that the clip 1010 and cap 1040 as shown in FIGS. 19a-19c are rotated ninety degrees or a quarter turn relative to how they should be oriented when inserting in one of the holes 905 in the edging 900 as discussed in more detail below.

In its normal attitude of operation, the clip 1010 is utilized with contactor wires 712a, 714a. The contactor wires 712a, 714a having a length determined by the distance at which a light or other device will be located relative to the edging 900, are threaded through bores 1012, 1014 respectively, whereby small portions or lengths of the contactor wires 712a, 714a protrude from the proximate end 1017. The small portions are of a length suitable to allow each to be bent over onto opposing elongate surfaces of the shaft 1016 and lie substantially parallel to the respective surfaces. The insulative covering of the protruding small portions are stripped to expose conductive portions 1021, 1023. The conductive portions 1021, 1023 are thus exposed when the contactor wire portions are wrapped over and laying along the shaft 1016 surfaces. The clip 1010 with the conductive portions 1021, 1023 is then pressed into the hole 905 such that the head 1018 substantially abuts one of the faces of the edging 900. With the clip 1010 in position within the edging 900, the cap 1040 is coupled to the shaft portion 1016 so as to retard the movement of the clip 1010 and provide a covering for the exposed conductive portions 1021, 1023.

The shaft portion 1016 comprises at least two fossas or grooves 1024 (four shown in FIG. 19a) defined on opposing elongate surfaces of the shaft portion 1016. The fossa 1024 run substantially perpendicular to the proximate end 1017 and the head portion 1018, and may extend for the entire length of the shaft portion 1016. The fossa 1024 are so sized and shaped as to receive an elongate segment of the conductive portions 1021, 1023 and enable the remaining segment of the conductive portions 1021, 1023 to crest the surface of the elongate shaft portion 1016. When a clip 1010 is inserted in a hole 905 (generally as oriented in FIG. 22) the crested segment of the conductive portions 1021, 1023 contact exposed portions 1026, 1028 of the conductors 1001, 1002 respectively which are exposed through formation of the hole or holes 905, to electrically connect a low voltage device to the edging 900 in a completed circuit.

FIG. 20 is an enlarged and fragmentary view of the region around the hole 905. The edging 900 has a height of approximately 4 to 6 inches. Each of the conductors or wires 1001 and 1002 has a height H of approximately 0.015"+/−0.005, a depth D of approximately 0.070"+/−0.0025. As shown, the hole 905 notches a section of the conductors 1001, 1002 to expose a portion of the conductors 1001, 1002 within the inner edge surface of the hole 905. Importantly, the hole 95 is located and dimensioned so as to notch the conductors 1001, 1002 without severing them. However, the present invention contemplates and includes variations in the design of the clip 1010 or the use of other conductive objects placed in each hole 905, to provide continuity for the conductors 1001, 1002 in the edging 900.

In the preferred embodiment of the present invention, the upper conductor 1001 is located approximately 0.190 inches from the top edge of the lawn edging 900 and the lower conductor or wire 1002 is positioned approximately 0.270 inches below the upper conductor. The lawn edging 900 is sufficiently thick such that the presence of the conductor 1001 does not appreciably distort the planar surface of the lawn edging 900. Similarly, conductor 1002 is sized and shaped so as to avoid distortion to the surface of the lawn edging 900. The spacing between conductors is selected to be approximately equivalent to or slightly smaller than the dimensions of the shaft portion 1016 of clip 1010. As previously described, the hole 905 may be located and sized so as to form a notch in each of the conductors 1001,1002 forming contacting regions in the conductors and enabling a friction fit of the shaft portion 1016 having the conductive portions 1021, 1023 of the contactor wires 712a, 714a. Accordingly, the top edge 1030 of the hole 905 is located approximately 0.250 inches from the top edge of the lawn edging 900. Further, the hole 905 is dimensioned to be approximately 0.300×0.300 inches thus notching approximately 0.06 inches into neighboring elongate edges of the conductors 1001, 1002 adjacent thereto.

The notching of the conductors 1001, 1002 exposes contact regions 1026, 1028. The contact regions 1026, 1028 are abutted by the exposed conductive wire portions 1021, 1023 thus providing connectivity to the contactor wires 712a, 714a and thereby establishing a closed circuit and current flow to any devices attached to the wires 712a, 714a, when the edging 900 is connected to power source.

FIG. 21 provides an illustration for the installation of the preferred embodiment of the present invention. As shown a low voltage device 1045 such as a light is connected to a lawn edging section 900, by contactor wires 712a, 714a, in collaboration with clip 1010 and cap 1040.

As illustrated in FIG. 22, the present invention further provides means for attaching and connecting two or more sections of lawn edging 900 together. When connected the clip 1010 of the present invention provides connectivity between the conductors 1001, 1002 in a first section of lawn edging 900a to conductors 1001a, 1002a in a second section of lawn edging 900b. In operation, a small length of contactor wire 712a, 714a may be inserted into the clip 1010 and wrapped around the shaft portion 1016 as earlier described. A first section and a second section of lawn edging 900a, 900b, are located adjacent one another, with at least one hole 905 from each section 900a, 900b in alignment with the other whereby a clip 1010 may be inserted through the holes of both sections simultaneously. In this position, exposed conductive portions 1021, 1023 of the clip 1010 abuts the contact regions 1024, 1026 of each of lawn edging sections 900a, 900b to provide connectivity therebetween and secure the sections together. The cap 1040 may then be coupled to the shaft portion 1016 to secure the clip 11010 in place and shield the conductive portions 1021, 1023. Excess lengths of contactor wire 712a, 714a that protrude from head portion 1018 may then be trimmed off or conversely, connected to a light or other low voltage device. For example as shown schematically in FIG. 22, the contactor wires 712a and 714a may be connected to a power source 1050 such as a transformer, which can be wired into or plugged into a relatively high voltage (i.e. 110 volt AC) residential electrical circuit to convert the electrical current to a relatively low voltage and safer (i.e. 12 volts DC) power for use by the edging 900 and associated low voltage devices. It is to be understood that as used herein such a transformer would be considered a low voltage device. It is understood that other configurations, variations or methods for establishing connectivity between the sections of lawn edging 900 may be employed. Such other methods may include providing a variant of the clip 1010 which may have conductors already aligned and embedded along the shaft portion 1016, for use in making such connections. All such variations, methods or configurations are anticipated and within the scope of the present invention.

The present invention provides a significant improvement over prior art systems in a number of ways. First, the utilization of cuboid conductors 1001, 1002 as opposed to cylindrical conductors provides better conductivity through an increased wire gage, and larger contact regions 1024, 1026, given the limitations of the thickness T of the lawn edging 900. As should be appreciated by one skilled in the art, when an elongate section is cutout from a cuboid and a cylinder having equal thickness, the remaining area of the cuboid is much greater than that of the cylinder, which in this case translates to a larger contact region and more conductive material across the holes 905 i.e. higher wire gage. A notched cylindrical conductor that has a diameter that approximately equals the depth D of the conductors 1001, 1002, while meeting the aesthetic feature of the present invention, would be limited by the current that the cylindrical conductor could safely carry, and would produce a greater amount of heat and other electrical deficiencies in the conductors 100, 1002. In the alternative, if a notched cylindrical conductor has a diameter approximately equal the height H of the conductors 1001, 1002, so as to overcome the wire gage limitation, then the planar surface of the lawn edging 900 would be distorted by the bulge from the cylindrical wire. The present invention addresses and overcomes these limitations.

Second, the present invention provides for solderless connection of lighting or other devices. Electrical contact is provided by the removeable clip 1010, when it is located within the hole 905, without the need for any soldering. As would be appreciated by one skilled in the art, soldering would require that conductor wire be made from specific combinations of compounds or that the conductor be plated with some other materials such as Tin (Sn). Such requirements result in higher manufacturing costs as do the other precautions or conditions that must be met in order to minimizing damage to the surface of the lawn edging 900. Additional costs are also incurred when additional materials or steps are incorporated into the manufacturing process in order to overcome any unsightliness that may result from soldered connections.

Third, the clip 1010 assembly described herein enables a variety of devices to be located immediately adjacent to the lawn edging 900 or to be located at a distance there from. With the present invention, an end user/consumer, can dictate the length of the contactor wires 712*a*, 714*a* and thus locate a device precisely where it is desired without having to relocate sections of the lawn edging 900.

Fourth, the manufacturing process for the lawn edging 900 of the present invention is less complicated than prior art processes. For example, lamps, bulb bases, speakers or other devices need not be considered or incorporated into the manufacturing process since any such devices may be selected and simply connected to the contactor wires 712*a*, 714*a*, by end users.

Fifth, the present invention enables a cutout tool to be provided to end-users so that the specific location of a hole 95 can be determined and made by the end user. The cutout tool includes guide fences and is sized and shaped, to locate and make holes 905 at a fixed distance from the top edge of the lawn edging 900, in accordance with the earlier description of the preferred embodiment. Even further, the present invention provides an end user with the option to increase the number of holes 95 and thus the number of devices that he or she chooses to place along a section of the lawn edging 900.

Sixth, the present invention provides a means for an end user to simply connect multiple sections of lawn edging 900*a*, 900*b*. Prior art systems require wire nuts, particular edge designs, or other similar methodologies utilized by prior art systems to facilitate extending the coverage distance of lawn edging 900. The clip 1010 and cap 1040 when utilized in conjunction with the holes 905 allow multiple sections of lawn edging 900*a*, 900*b* to be secured together and provide continuous connectivity to the conductors 1001, 1002 within each of the sections of lawn edging 900*a*, 900*b*.

It is to be understood that while certain forms of the present invention have been illustrated and described herein, the present invention is not intended to be limited to the specific forms or arrangement of parts described and shown herein. Such illustrations and description are merely exemplary and provided to facilitate an understanding of the invention. For example, it is foreseen that the conductors or wires 300 could be sandwiched between a veil layer 202 and the adjacent continuous strand mat layer 204 or the wires 300 can be between one of the continuous strand mat layers 204 and the rovings layer 206. In such an embodiment the thickness of the edging 20 around the wires 300 could be greater than the thickness of the edging 20 elsewhere.

In addition, it is to be understood that although the third and fourth embodiments discussed above show the connector mounted in a single hole exposing both wires in the edging, more than one hole, for example two or four could be used to expose the conductors and the clip could have multiple shafts or prongs to extend into the hole and position electrical contacts in contact with the conductors.

Fifth Embodiment

FIGS. 23-27 show a plug light assembly 1051 for use with the edging 900 in which the light is integrated into the clip. More specifically, the plug light assembly 1051 includes a light socket body 1055 with a plug 1057 projecting from one end thereof and a light socket 1059 formed in an opposite end. The plug light assembly 1051 also preferably includes a face plate 1061 formed at the interface between the light socket body 1055 and the plug 1057.

The light socket 1059 is sized to receive an incandescent light bulb, a light emitting diode or other electric light source 1063 having a pair of electric leads or wires 1065 and 1066 projecting from one end thereof. The leads 1065 and 1066 are threaded or extended through separate fossa or bores 1067 and 1068 respectively formed in the plug light assembly 1051 and extending from the light socket 1059 and through the light socket body 1055 and the plug 1057.

The plug 1057 is generally square in cross-section and includes a base 1071 with a pair of rearwardly projecting legs or prongs 1072 and 1073 separated by a groove 1075. The plug 1057 is sized to fit into and form a friction fit with the holes 905 in the edging 900. The bores 1067 and 1068 extend through the base 1071 of the plug 1057 and open into the groove 1057.

The leads 1065 and 1066 are sized long enough to allow a portion of each lead to be bent back over and across an outer surface 1083 and 1084 respectively of the plug base 1071 and at least up to a rear surface 1085 of the face plate 1061. When the plug 1057 is inserted in a hole 905 with the plug 1057 oriented so that the opposed outer surfaces 1083 and 1084 engaged the conductors 1001 and 1002, the leads 1065 and 1066 are pressed against and held in electrical contact with the conductors 1001 and 1002.

A cap 1089 similar to cap 1040 is securable over the end of the plug 1057 to help further secure the plug light assembly 1051 in place on the edging 900. The cap includes a receiver 1090 which is square in cross-section and sized to receive the plug 1057 in a friction fit. The plug 1057 preferably includes a pair of grooves 1092 and 1093 formed in opposite sides of the plug 1057 along the sides of the legs 1072 and 1073. Mating guides or tongues 1096 and 1097 are formed in the cap receiver 1090. The tongues 1096 and 1097 in cap receiver 1090 extend into aligned grooves 1092 and 1093 formed in the plug side walls 1094 and 1095 in a friction fit to further assist in securing the cap 1089 to the plug 1057. Recesses 1098 and 1099 are formed in the cap receiver 1090 on sides opposite the tongues 1096 and 1097 to receive or accommodate or receive the leads 1065 and 1066 extending across the plug surfaces 1083 and 1084 when the cap 1089 is secured to the plug 1057.

It is to be understood that the geometry of the caps 1089 could be modified to provide different appearances. In the embodiment shown, the cap is semi-spherical with a flattened edge 1100. The flattened edge 1100 helps the installer properly orient the cap 1089 such that when the plug 1057 is inserted in the cap receiver 1090 the leads 1065 and 1066 will be positioned to engage the conductors 1001 and 1002.

The plug light assembly 1051 preferably also includes a lens 1101 which is removably securable on the light socket body 1055 over the light source 1063. The lens 1101 shown includes a semispherical dome portion 1102 and a cylindrical or tubular receiver 1103 which fits over and frictionally engages the light socket body 1055. A guide tongue 1105 is preferably formed on the light socket body 1055 to mate with a guide slot 1106 formed in the cylindrical receiver 1103 of the lens 1101 to ensure proper alignment or orientation of the lens 1101 on the light socket body 1055.

The lenses 1101 may be formed of a clear and transparent material such as a plastic or glass or the lenses 1101 may be tinted a selected color. It is foreseen that extra lenses 1101 of selected tints could be supplied with the plug light assembly or sold separately to allow the installer to switch out lenses 1101 to create a selected tinted color arrangement. For example, during the Christmas season, the clear lenses 1101 could be replaced with lenses 1101 tinted red and green, for Independence Day red, blue and clear, and for Halloween orange.

As shown in FIGS. 23-25, the light socket body 1055 is preferably angled relative to the face plate 1061 and the plug 1057 of the plug light assembly 1051. The angle between the light socket body 1055 and the face plate 1061 is preferably between thirty (30) and sixty (60) degrees. The plug light assembly 1051 can then be installed on the edging 900 such that the light socket body 1055 angles downward or upward relative to the edging 90. An installer may angle the light socket bodies 1055 downward to direct light emitted from the light source 1063 downward toward the ground or plantings located near the edging 900. Alternatively, the light socket bodies 1055 may be angled upward to direct a beam upward against a wall or the like to function as spotlights. It is also foreseen that the leads 1065 and 1066 could be oriented to extend along the sides 1094 and 1095 of the plug 1057 such that the plug light assembly could be oriented generally sideways relative to the hole 905 in the edging 900 with the light socket body 1055 angling sideways relative to the edging 900.

It is also foreseen that the light socket body 1055 could be formed as a ninety degree elbow to orient the light socket 1059 vertically relative to the edging 900 and direct the light emitted from the light source 1063 vertically. It is foreseen that the geometry of the plug could be modified to allow the light body assembly to be mounted on top of an upper edge of the edging 900 with legs of the plug extending opposite faces of the edging with feet extending into the edging hole 905 to position associated leads 1065 and 1066 in electrical contact with conductors 1001 and 1002. It is also foreseen that instead of a single rectangular or square hole 905, a pair of holes could be utilized for receiving separate legs of the plug portion of the plug light assembly with one hole associated with each conductor 1001 and 1002 in the edging 900. Each leg, with an associated lead from the light source would then be inserted in a separate hole.

It is foreseen that in addition to the lenses 1101, the light socket body 1055 and the cap 1089 could also be formed from clear or tinted, transparent or translucent material such as plastic such that light from the light source 1063 would be transmitted therethrough allowing light to pass through the cap 1089 causing it to appear to glow or emit light on the side of the edging 900 opposite the light source 1063. It is also foreseen that the light socket body 1055 and cap 1089 could be formed from opaque materials including opaque plastics such that light emitted by the light source 1063 is directed solely through the lens 1101.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

What is claimed and desired to be secured by Letters Patent is as follows:

1. A lawn edging system for installation in ground contact comprising:
    a first edging strip having a top edge, a bottom edge, a pair of opposed ends, a length, and a thickness;
    said first edging strip including first and second electrical conductors embedded therein and running continuously along said length of said first edging strip in spaced relation in an upper portion of said first edging strip;
    at least one hole formed completely through said first edging strip and sized and shaped to expose portions of said first and second electrical conductors;
    a plug light comprising a light socket body with a plug projecting from an opposite end thereof; a light socket is formed in said light socket body and a light source is positioned in said light socket with a pair of electrical leads extending through said light socket body and said plug; said plug inserted through said at least one hole in said first edging strip with said first and second electrical leads held in electrical contact with said exposed portions of said first and second electrical conductors respectively wherein when said plug is inserted through said at least one hole an end of said plug extends beyond said edging strip exposing said end of said plug; and
    a cap sized to be wider than said at least one hole and securable on said exposed end of said plug opposite said light socket body.

2. The lawn edging system as in claim 1 wherein said light socket body and said plug are integrally formed from plastic.

3. The lawn edging system as in claim 1 further comprising a transparent lens removably securable on an end of said light socket body opposite said plug.

4. The lawn edging system as in claim 3 wherein said lens is selected from a plurality of lenses tinted different colors.

5. The lawn edging system as in claim 4 wherein said light socket body, said plug and said cap are formed from translucent plastic.

6. The lawn edging system as in claim 1 wherein said light socket body is separated from said plug by a faceplate and wherein said light socket body extends from said face plate at an angle of less than ninety degrees such that when said plug is inserted in said hole in a first orientation said light socket body extends in a first angled orientation and when said plug is inserted in said hole in a second orientation said light socket body extends in a second angled orientation.

7. The lawn edging system as in claim 1 wherein said first edging strip is formed from a flexible fiberglass composite.

8. A lawn edging system for installation in ground contact comprising:
    a first fiberglass composite strip having a top edge, a bottom edge, a pair of opposed ends, a length, and a thickness;
    said first fiberglass composite strip including first and second electrical conductors embedded therein and running continuously along said length of said first fiberglass composite strip in spaced relation in an upper portion of said first fiberglass composite strip;
    a hole formed completely through said first fiberglass composite strip between said first and second electrical conductors and sized and shaped to expose portions of said first and second electrical conductors;
    a plug light comprising a face plate with a plug projecting from one side thereof and a light socket body projecting from an opposite side of said face plate at an angle of between approximately thirty to sixty degrees; a light socket is formed in said light socket body and a light source is positioned in said light socket with a pair of electrical leads extending through said light socket body and said plug; said plug inserted through said hole in said first fiberglass composite strip with said first and second electrical leads held in electrical contact with said exposed portions of said first and second electrical conductors respectively wherein when said plug is inserted through said at least one hole an end of said plug extends beyond said edging strip exposing said end of said plug; said plug of said plug light selectively positionable within said hole in a first orientation wherein said light socket body angles upward relative to said first fiberglass composite strip and a second orientation wherein said light socket body angles downward relative to said first fiberglass composite strip; and a cap sized to be wider than said at least one hole and securable on said exposed end of said plug opposite said light socket body.

9. The lawn edging system as in claim 8 further comprising a lens removably securable on an end of said light socket body opposite said plug.

10. The lawn edging system as in claim 9 wherein said lens is selected from a plurality of lenses of different colors.

11. A lawn edging system for installation in ground contact comprising:

a first fiberglass composite strip having a top edge, a bottom edge, a pair of opposed ends, a length, and a thickness;

said first fiberglass composite strip including a first and second electrical conductor embedded therein and running continuously along said length of said first fiberglass composite strip in an upper portion thereof, said conductors being flattened in shape and oriented in said first fiberglass composite strip such that said first conductor is taller than it is wide;

at least one opening formed completely through said first fiberglass composite strip to expose a portion of said first and second conductors;

a clip having a shaft and a head and having first and second electrical contacts mounted on said shaft, said shaft inserted through said at least one opening to hold said first and second electrical contacts in electrical contact with said first and second conductors respectively wherein when said shaft is inserted through said at least one opening an end of said shaft extends beyond said first fiberglass composite strip exposing said end of said shaft; said first and second electrical contacts electrically connected to a low voltage device; said head sized to be wider than said at least one opening;

a cap sized to be wider than said at least one opening and removably securable on said exposed end of said shaft opposite said head; and a stake for securing said first fiberglass composite strip in the ground.

12. The lawn edging system as in claim 11 wherein said low voltage device is a light.

13. The lawn edging system as in claim 11 wherein said low voltage device is a transformer.

\* \* \* \* \*